US006829120B2

(12) United States Patent
Bagnell et al.

(10) Patent No.: US 6,829,120 B2
(45) Date of Patent: Dec. 7, 2004

(54) DATA CARTRIDGE LOAD/UNLOAD MECHANISM FOR DISK DRIVE

(75) Inventors: Glade N. Bagnell, Longmont, CO (US); Robert D. Freeman, Erie, CO (US); Joseph P. Manes, Arvada, CO (US); Stephen A. Misuta, Superior, CO (US); Shane G. Nowell, Longmont, CO (US); Brian L. Rappel, Lyons, CO (US); Edwin J. Wadsworth, Longmont, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 0 days.

(21) Appl. No.: 09/946,845

(22) Filed: Sep. 4, 2001

(65) Prior Publication Data

US 2002/0126413 A1 Sep. 12, 2002

Related U.S. Application Data

(60) Provisional application No. 60/265,830, filed on Jan. 31, 2001.

(51) Int. Cl.[7] .............................................. G11B 17/04
(52) U.S. Cl. ................................................... 360/99.06
(58) Field of Search ........................... 360/99.06, 99.01, 360/99.02, 94, 78.05; 369/75.1, 75.2, 77.2, 44.28, 178.01, 30.76; 235/475

(56) References Cited

U.S. PATENT DOCUMENTS

| | | | |
|---|---|---|---|
| 4,456,935 A | 6/1984 | J′′nosi ........................ 360/97 |
| 4,627,039 A | * 12/1986 | Meyer ...................... 369/44.28 |
| 4,750,065 A | 6/1988 | Masaki et al. ................. 360/99 |
| 4,866,693 A | 9/1989 | Odawara et al. ............ 369/75.2 |
| 5,182,742 A | 1/1993 | Ohmori et al. .............. 369/116 |
| 5,202,861 A | 4/1993 | Yoshida ........................ 369/113 |
| 5,485,329 A | 1/1996 | Lee .......................... 360/99.06 |
| 5,485,330 A | 1/1996 | Hirose et al. ............. 360/99.06 |
| 5,703,857 A | 12/1997 | Davis et al. ................ 369/77.2 |
| 5,724,331 A | 3/1998 | Davis et al. ................ 369/77.2 |
| 5,748,577 A | * 5/1998 | Sakiyama ................. 369/30.76 |
| 5,768,241 A | 6/1998 | Kanazawa et al. .......... 369/77.2 |
| 5,781,364 A | * 7/1998 | Hashimoto et al. ....... 360/78.05 |
| 5,920,442 A | * 7/1999 | Kasuga et al. ................. 360/94 |
| 5,959,956 A | 9/1999 | Takishima ................... 369/75.2 |
| 6,078,563 A | 6/2000 | Goto et al. ................... 369/291 |
| 6,118,618 A | 9/2000 | Kumakura ................ 360/99.02 |
| 6,182,899 B1 | * 2/2001 | Muller et al. ................ 235/475 |
| 6,262,959 B1 | 7/2001 | Hashimoto .................. 369/77.2 |
| 6,272,093 B1 | 8/2001 | Kurozuka et al. .......... 369/77.2 |
| 6,314,076 B1 | 11/2001 | Arai et al. ................... 369/244 |
| 6,396,794 B1 | * 5/2002 | Tsugami et al. ........ 369/178.01 |
| 6,404,720 B1 | * 6/2002 | Inoue .......................... 369/77.2 |
| 6,445,532 B1 | 9/2002 | Kappel ......................... 360/92 |
| 6,469,865 B1 | 10/2002 | Maruyama ................ 360/99.06 |
| 6,512,731 B1 | 1/2003 | Seo et al. .................... 369/77.2 |
| 6,538,971 B2 | 3/2003 | Seo et al. .................... 369/77.2 |

OTHER PUBLICATIONS

Spotts, M.F., "Design of Machine Elements", Prentice–Hall, Inc., Fourth Edition (1971), pp. 223–226.

\* cited by examiner

*Primary Examiner*—Tianjie Chen
(74) *Attorney, Agent, or Firm*—MacPherson Kwok Chen & Heid LLP

(57) ABSTRACT

A disk drive includes a housing, a cartridge tray, and a cam plate. The cartridge tray is adapted to hold a cartridge that includes a data storage disk. The housing has a pair of vertical cartridge tray pin slots which hold tray pins that are part of the cartridge tray. The cam plate includes a pair of cam slots formed at an oblique angle to the cartridge tray pin slots. The tray pins extend through the cam slots into the cartridge tray pin slots. Movement of the cam plate back and forth causes the tray pins and cartridge tray to move vertically between a loaded position, where data can be read from or written to the data storage disk, to an unloaded position. The use of two cartridge tray pins allows the cartridge tray to rotate about an axis defined by the tray pins, and this action assists in locating the cartridge precisely in a repeatable position, in contact with a plurality of datums, when it is fully loaded.

19 Claims, 33 Drawing Sheets

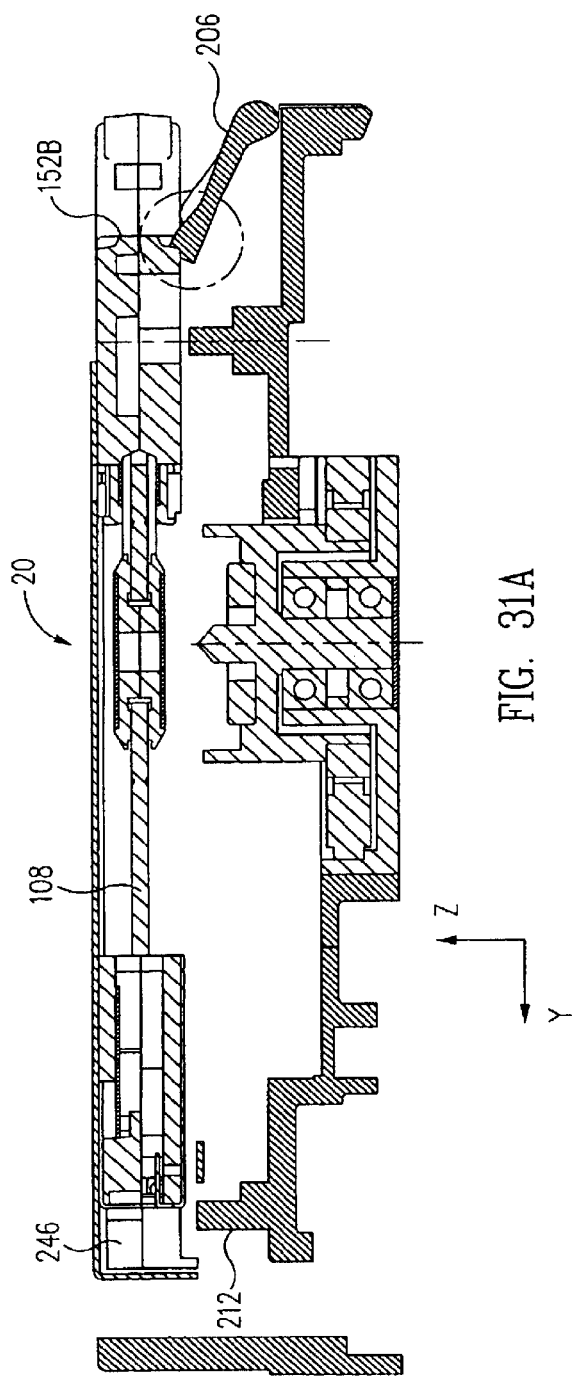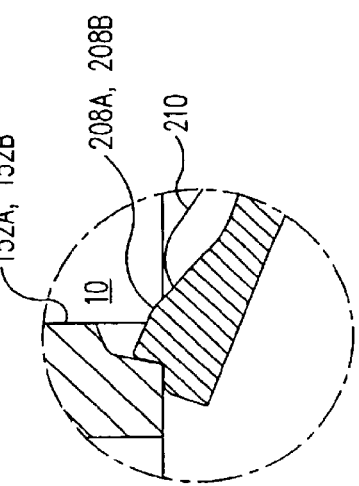
FIG. 31A
FIG. 31B

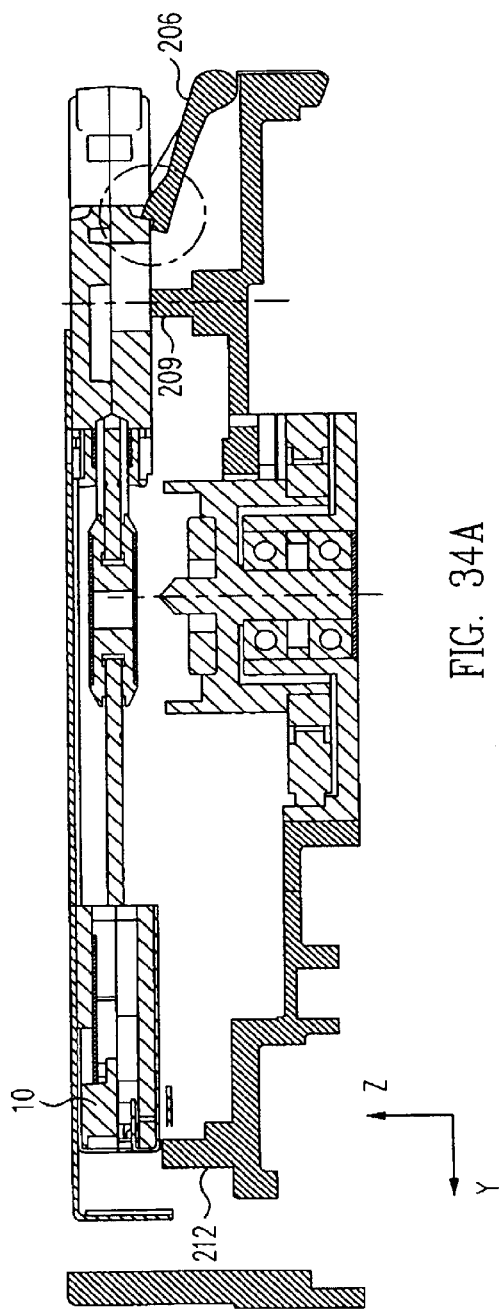
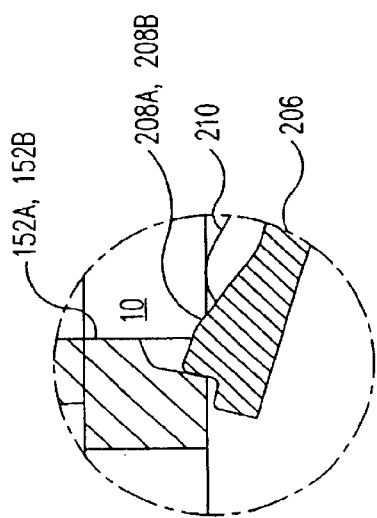
FIG. 34A
FIG. 34B

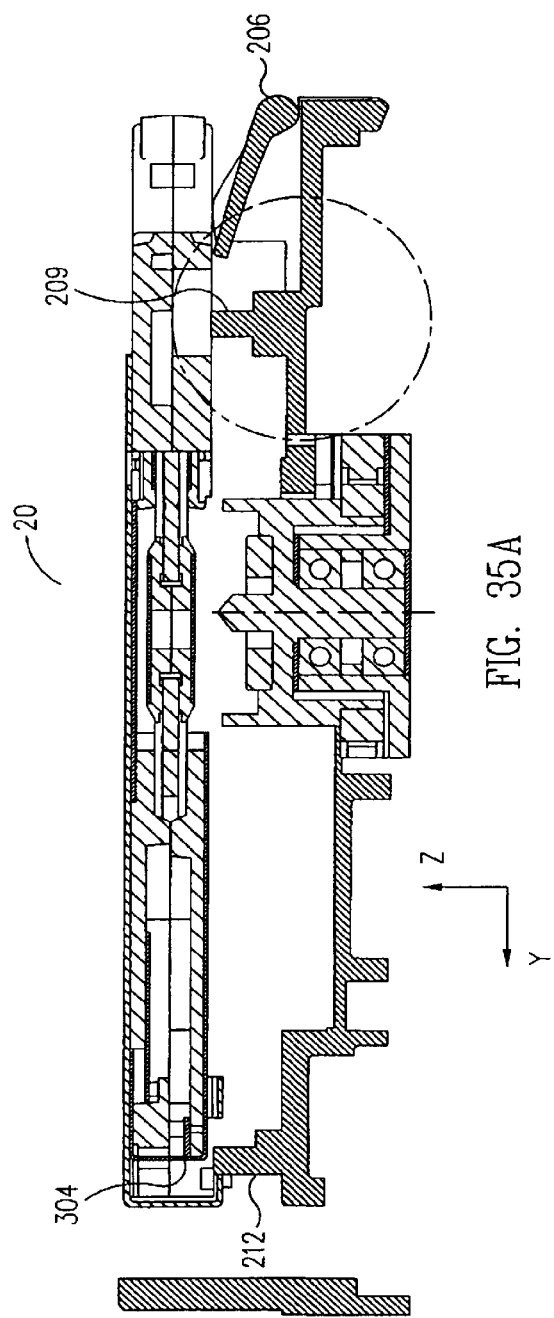
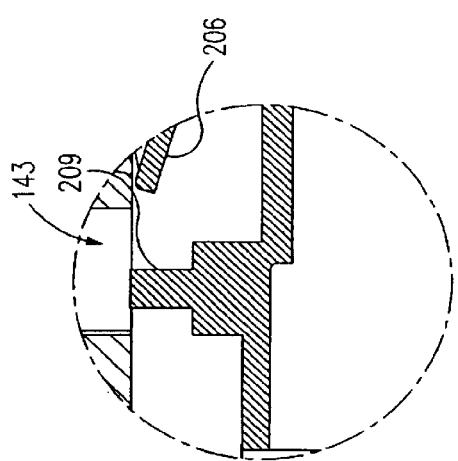
FIG. 35A
FIG. 35B

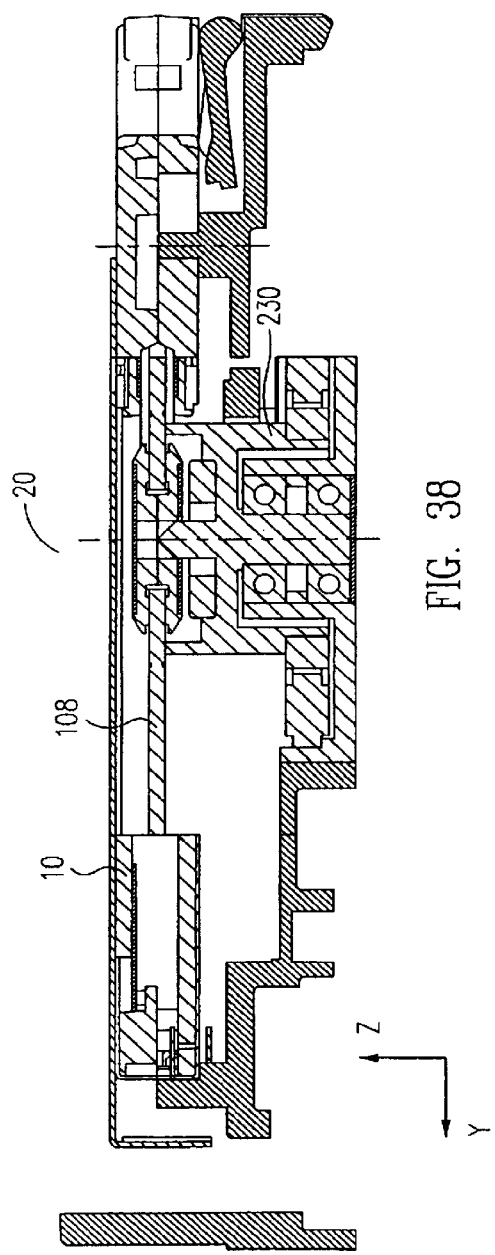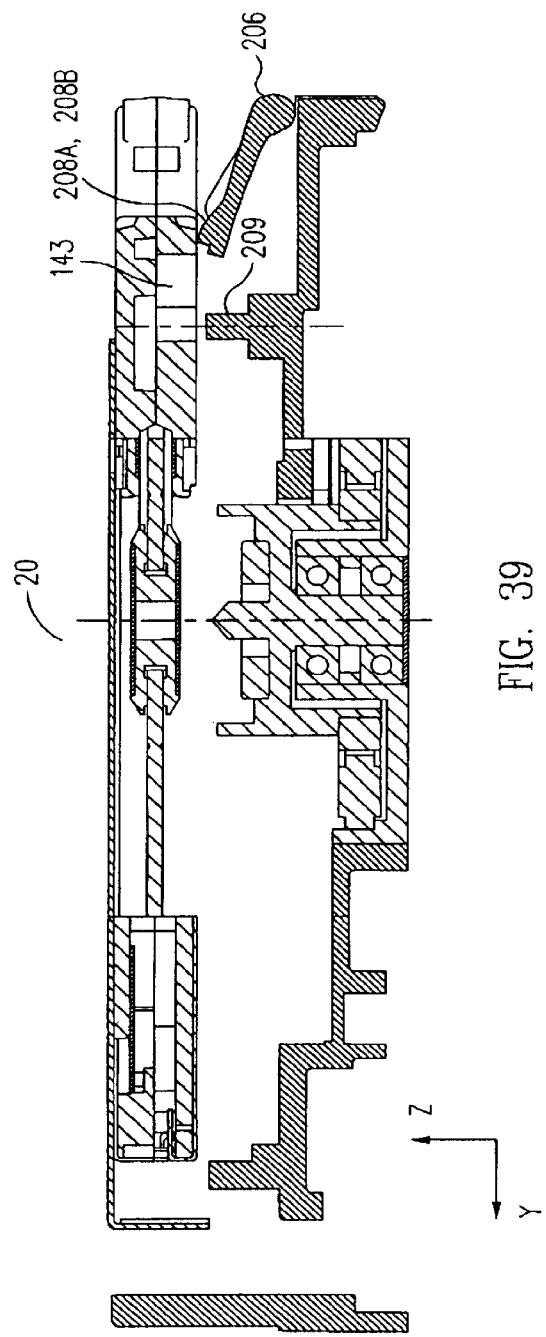

DATA CARTRIDGE LOAD/UNLOAD MECHANISM FOR DISK DRIVE

CROSS REFERENCE TO RELATED APPLICATIONS

This application is related to provisional Application No. 60/265,830, filed Jan. 31, 2001, entitled "Cartridge-Loading Mechanism for Data Storage Disk".

This application is also related to application Ser. No. 09/947,151, filed Sept. 4, 2001, entitled "Mechanism for Limiting Ejection of Data Cartridge From a Disk Drive", application Ser. No. 09/947,004, filed Sept. 4, 2001, entitled "Mechanism for Positioning a Data Cartridge in a Disk Drive", and application Ser. No. 09/947,313, filed Sept. 4, 2001, entitled "Mechanism for Opening a Shutter of a Data Cartridge", each of which is filed on even date herewith.

Each of the above-referenced applications is hereby incorporated herein by reference in its entirety

BACKGROUND OF THE INVENTION

1. Field of the Invention

This invention relates to a mechanism for loading and unloading a cartridge from a disk drive.

2. Description of the Related Art

Data storage disks, and in particular optical data storage disks, are widely used for a number of purposes. For example, downloading data via computer networks such as the Internet onto data storage disks is becoming increasingly popular. The downloaded data may include movies, music recordings, books, and other media. There are different types and sizes of data storage disks available for storing and accessing the downloaded information.

Data storage disks are often housed in cartridge or cassette to protect the disk from damage. For example, magnetic disks (also referred to as floppy discs) are commonly housed in a cartridge referred to as a diskette. Diskettes are inserted into the computer by the user. Typically, a spring is used to exert a force to hold the diskette in a fixed position. Holding the diskette in place using pressure from a spring can be suitable for stationery operation. However, a spring-loaded mechanism has several disadvantages for portable devices.

Portable computers and other data reading devices are subject to being bumped, jarred and dropped by the user. These actions can exert transient forces on the body of the computer (or other device) which in turn are transmitted to the cartridge or diskette. These transient forces may compress the spring, allowing the cartridge or diskette to move. Allowing the cartridge or diskette to move can interrupt the transfer of data from the disk to the device and cause operational failure.

Accordingly, what is needed is a mechanism to load and unload a data storage cartridge or diskette into a portable disk drive, without use of a spring, such that the cartridge is fixedly held in the correct operational position even when the disk drive is subjected to transient forces. Preferably, the device would be suitable for use in a handheld device such as a portable video camera. Preferably the mechanism would be suitable for loading and unloading a cartridge which contains an optical data storage disk.

SUMMARY OF THE INVENTION

A cartridge load/unload mechanism according to the invention includes a housing, a cartridge tray, and a cam plate. The housing has one or more cartridge tray pin slots, and the cam plate has one or more cam slots. The cam plate is positioned in the housing such that the cam slots are situated adjacent to and at an oblique angle to the cartridge tray pin slots. A cartridge tray pin extends through each cam slot and into the adjacent cartridge tray pin slot. The load/unload mechanism also includes a cartridge load/unload motor and a mechanism for turning the cartridge load/unload motor on when a cartridge has been inserted into the cartridge tray. The cartridge load/unload motor is mechanically coupled to the cam plate. When the cartridge load/unload motor turns on, the cam plate moves, causing the cartridge to be moved between a loaded position, where data can be read from or written to a data storage disk inside the cartridge, and an unloaded position, where data cannot be read from or written to the data storage disk.

BRIEF DESCRIPTION OF THE DRAWINGS

The present invention may be better understood, and its numerous objects, features, and advantages made apparent to those skilled in the art by referencing the accompanying drawings. The use of the same reference number throughout the figures designates a like or similar element.

FIGS. 31A and 31B are cross-sectional views of the disk drive with the cartridge fully inserted.

FIGS. 33A and 33B are a top views showing the flag and beam arrangement that is used to turn on the cartridge load/unload motor.

FIGS. 34A and 34B are cross-sectional views of the disk drive when the cartridge load/unload motor has just started to lower the cartridge into playing position.

FIGS. 35A and 35B are cross-sectional views of the disk drive when the alignment pin in the disk drive has started to enter the alignment feature on the cartridge.

FIG. 38 is a cross-sectional view of the disk drive when the cartridge has been lowered into the playing position.

FIG. 39 is a cross-sectional view of the disk drive when the cartridge has been lifted from the playing position to the point where the alignment feature on the cartridge clears the alignment pin in the disk drive.

DETAILED DESCRIPTION

The descriptions herein are of embodiments of a cartridge and mechanism for loading and unloading the cartridge into a disk drive. It should be understood, however, that the load/unload mechanism can be used with cartridges that are different from the cartridge described herein.

Figure 1:
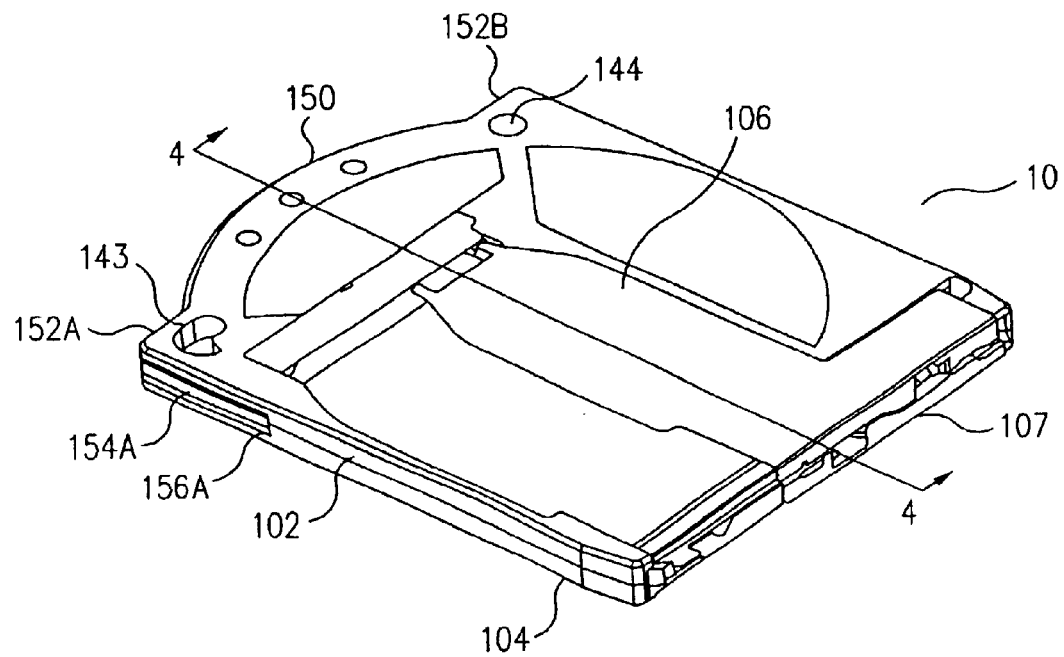
FIG. 1 is a perspective view of an optical disk cartridge usable with the load/unload mechanism of this invention, with its shutter closed.

First the cartridge will be described. FIG. 1 is a perspective view of a cartridge 10. Cartridge 10 contains a two-sided optical data storage disk which can be accessed from either side, and cartridge 10 is therefore symmetrical about the plane of the disk. Cartridge is fabricated with similar or identical housings 102, 104, which are bonded together to form an interior cavity to hold the optical disk. Thus, a view from the opposite side of the cartridge would be identical to the view shown in FIG. 1.

Figure 2:
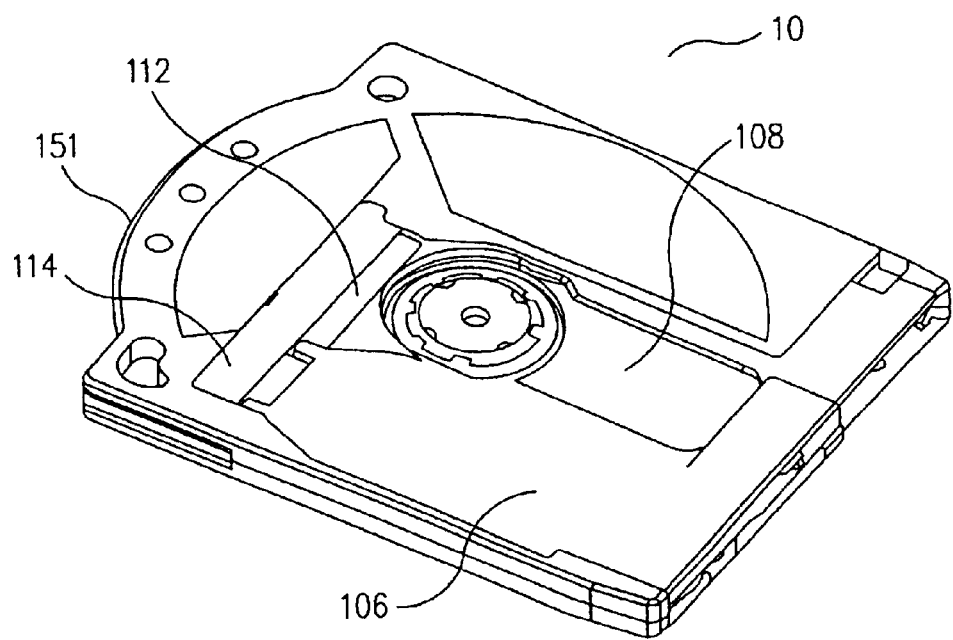
FIG. 2 is a perspective view of the cartridge with its shutter open.
Figure 3A:
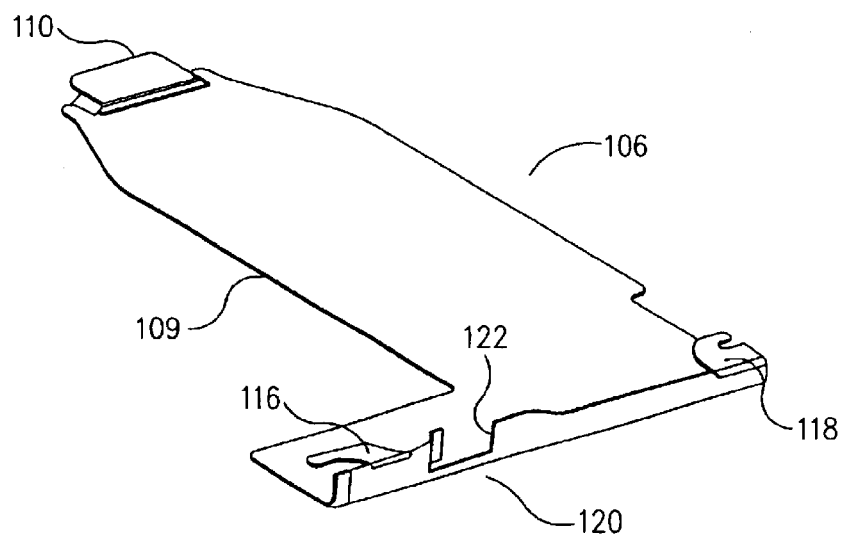
FIGS. 3A and 3B are perspective views of the shutter.
Figure 4:
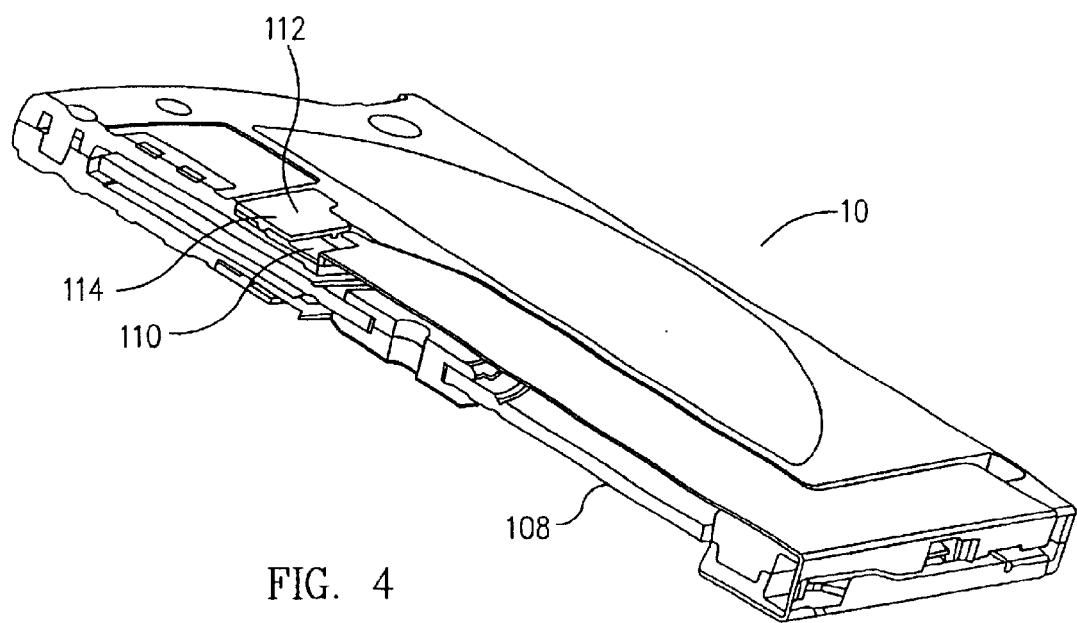
FIG. 4 is a perspective cross-sectional view of the cartridge.
Figure 3B:
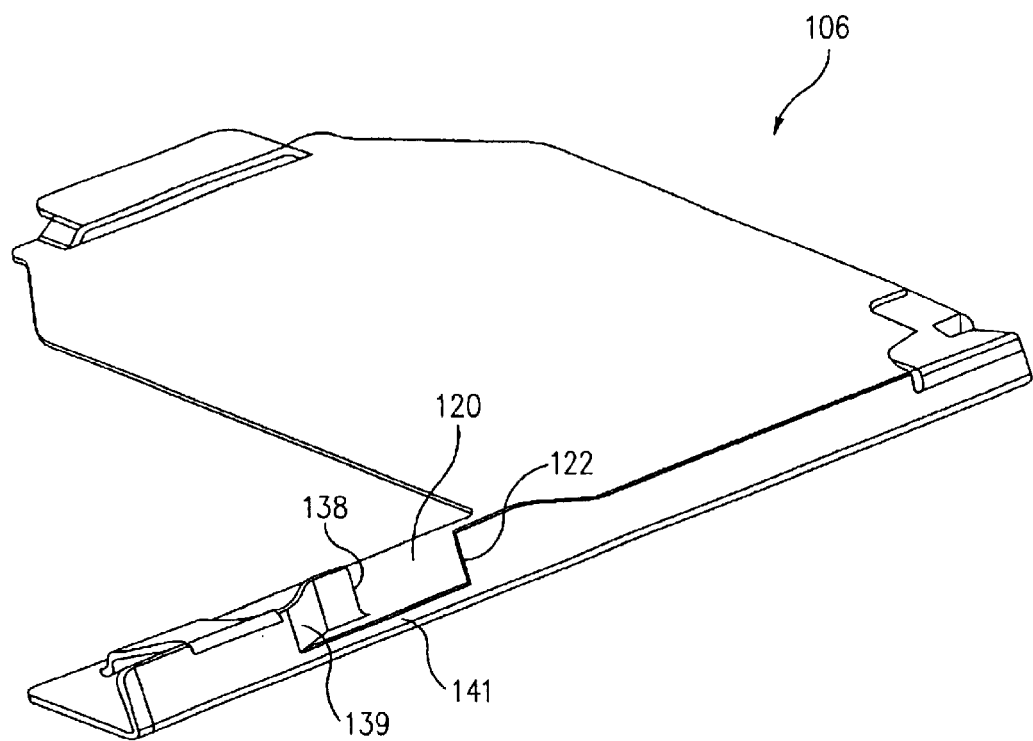
Figure 5:
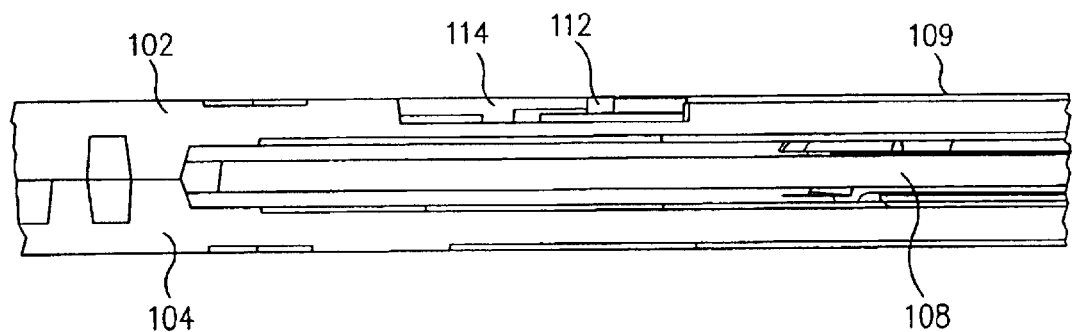
FIG. 5 is a detailed cross-sectional view of part of the structure that holds the shutter on the cartridge.

Access to the disk (not visible in FIG. 1) is controlled by a shutter 106 which overlies housing 102 and can be displaced to an open position to expose a portion of the optical disk. A similar shutter 107 which fits over housing 104 on the underside of cartridge 10 is only partially visible. FIG. 2 is view of cartridge 10 with shutter 106 in the open position, thereby exposing an optical disk 108. FIGS. 3A and 3B are views of shutter 106 in isolation, inverted as compared to the position of shutter 106 in FIGS. 1 and 2. As indicated, shutter 106 includes a tab 110 which is offset from a main body 109 of shutter 106 and slides in a recess 112 in housing 102. Tab 110 is maintained in place by a shutter keeper 114. FIG. 4 is a cross-sectional view taken at section 4—4 in FIG. 1 which shows the placement of tab 110 in recess 112. FIG. 5 is a detailed cross-sectional view of the same structure. As shown in FIG. 3A, shutter 106 also includes tabs 116 and 118 which fit into a slot between housings 102 and 104 on the front edge of cartridge 10. Shutter 106 is thus anchored to cartridge 10 by the combined operation of tabs 110, 116 and 118.

Shutter 106 also contains an opening 120 which is bounded on one side by a contact edge 122. As described below, a picker arm makes contact with contact edge 122 to move shutter 106 from the closed to open position.

Figure 6:
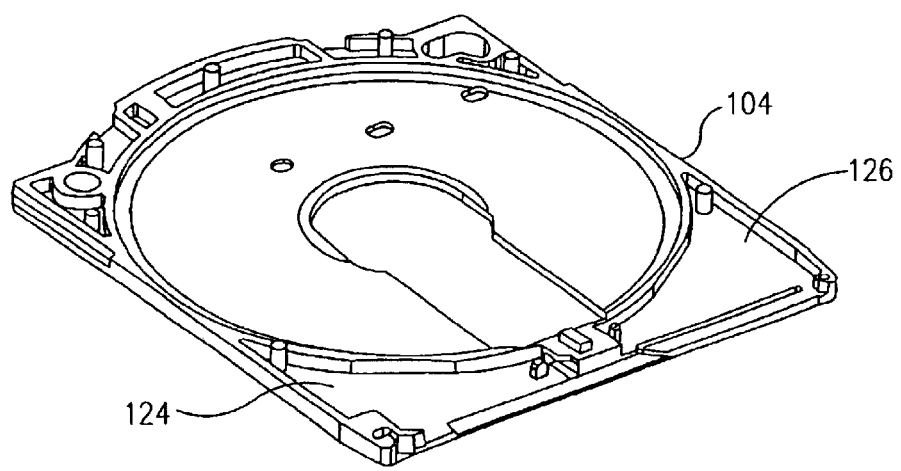
FIG. 6 is a perspective view of one of the housings that form the cartridge.

Cartridge 10 also includes mechanisms which (i) lock shutter 106 in its closed position, and (ii) spring-bias shutter 106 towards its closed position when it is in an open position. FIG. 6 is a view of housing 104 showing cavities 124 and 126 which contain these mechanisms. Cavity 124 contains a shutter lock that controls shutter 107 for housing 104; cavity 126 contains a spring that biases shutter 107 toward a closed position. Correspondingly, cavity 124 contains a spring that biases shutter 106, and cavity 126 contains a shutter lock that controls shutter 106.

Figure 7:
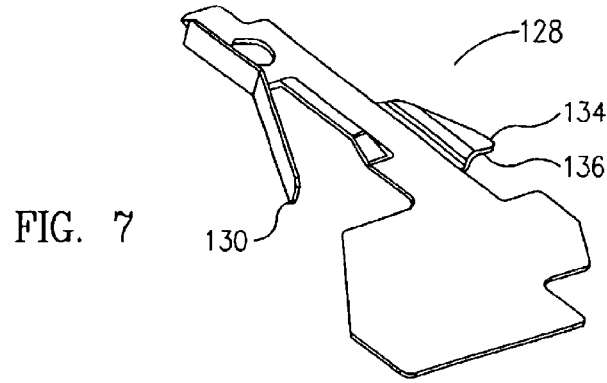
FIG. 7 is a perspective view of the shutter lock mechanism.
Figure 8:
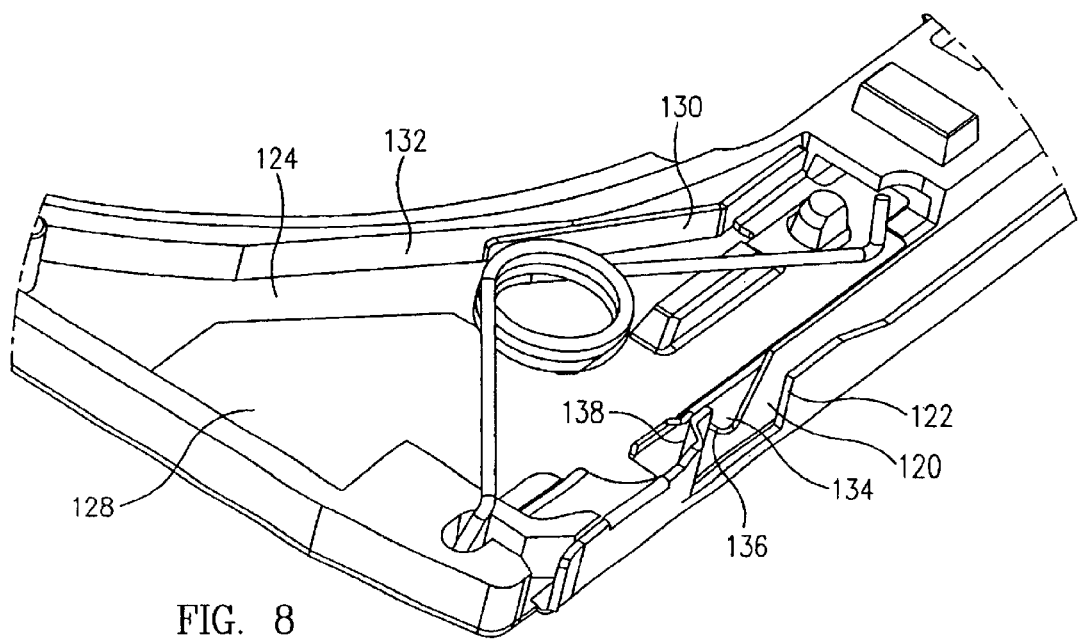
FIG. 8 is a detailed perspective view of one of the cavities in the cartridge that holds a shutter lock mechanism and a shutter return spring.
Figure 9:
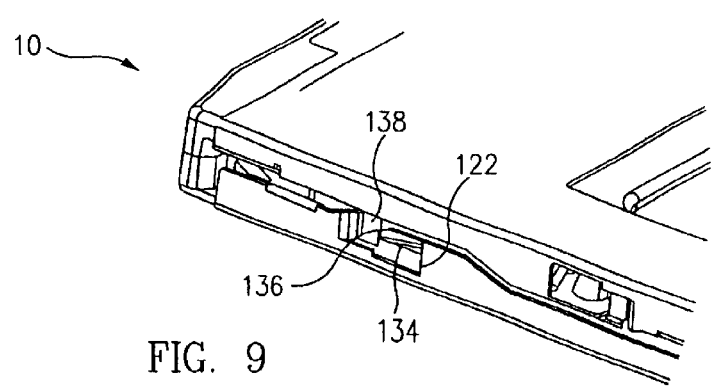
FIG. 9 is a perspective view of the portions of the shutter that engage the shutter lock mechanism.
Figure 10A:
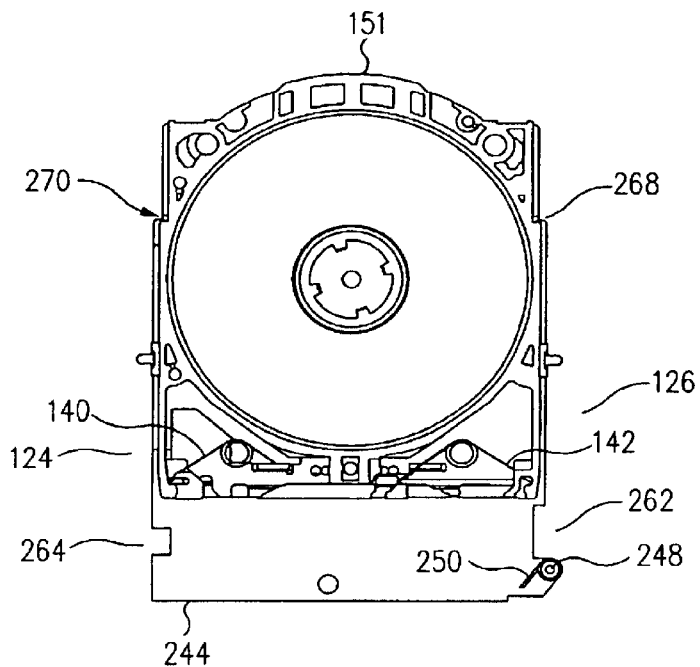
FIG. 10A is a top view of one of the cartridge housings partially inserted into the cartridge tray, showing in particular the locations of the shutter return springs.

FIG. 7 shows a shutter lock 128, and FIG. 8 shows shutter lock 128 in position in cavity 124. A leaf spring portion 130 of shutter lock 128 abuts a wall 132 of cavity 124, and the spring force from leaf spring portion 130 causes a wedge portion 134 of shutter lock 128 to protrude into opening 120 in shutter 107. FIG. 9 is a perspective view of this corner of cartridge 10, showing wedge portion 134 protruding through opening 120. As indicated, a locking edge 136 of wedge portion 134 abuts a locking tab 138 of the shutter, thereby holding the shutter in the closed portion. Note that shutter 106 is in the open position in FIG. 9. FIG. 10A is a view of housing 104 that shows how shutter return springs 140 and 142 are positioned in cavities 124 and 126, respectively.

Figure 10B:
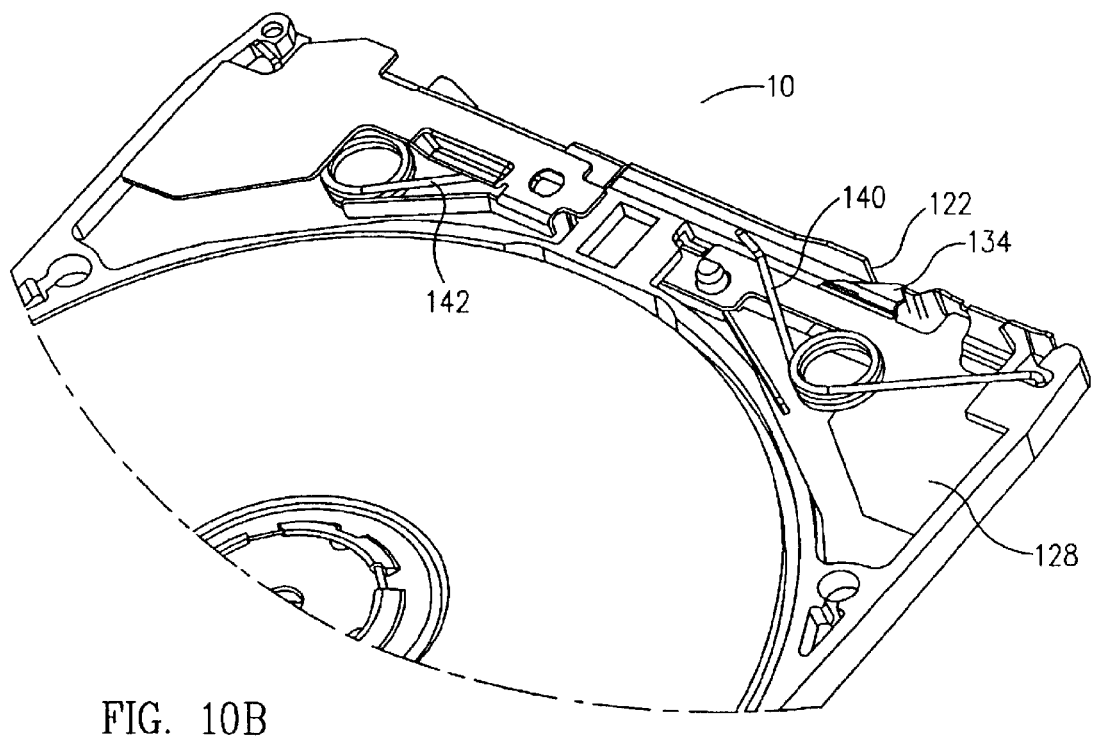
FIG. 10B is a view of the front portion of the cartridge.

Shutter return spring 142 biases shutter 106 closed, and shutter return spring 140 biases shutter 107 closed. FIG. 10B shows another view of the front portion of cartridge 10.

Application Ser. No. 09/730,647, filed Dec. 5, 2000, contains further details on the operation of shutters 106, 107, shutter lock 128 and shutter return springs 140, 142 and is incorporated herein by reference in its entirety.

Figure 11:
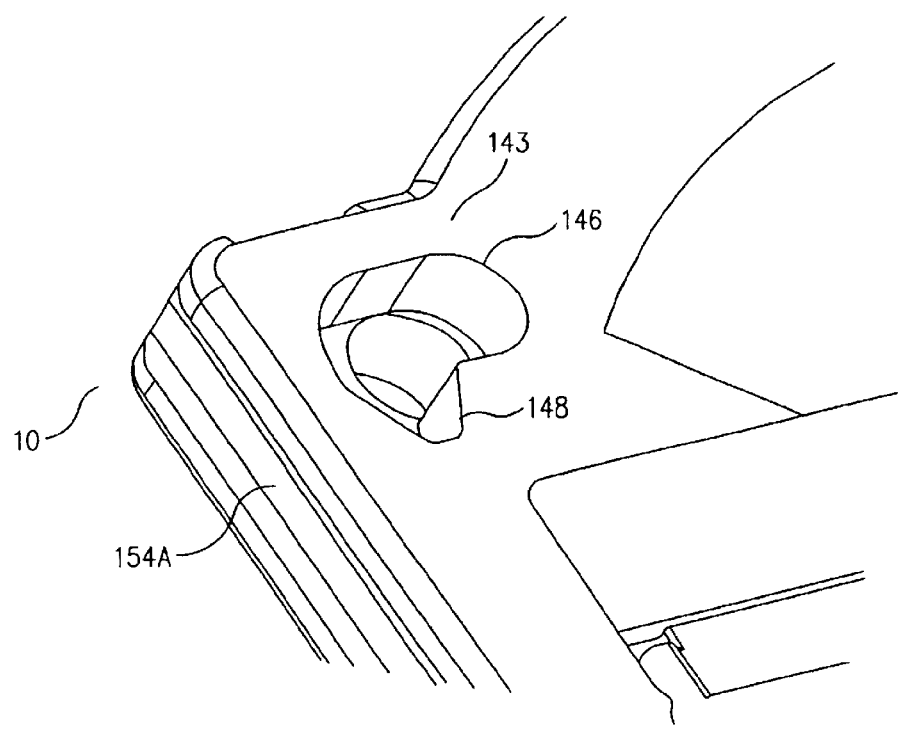
FIG. 11 is a detailed perspective view of one of the alignment features in the cartridge.

Referring again to FIG. 1, cartridge 10 also has an alignment feature 143 which, as described below, mates with an alignment pin in the disk drive to assist in positioning the cartridge. A corresponding alignment feature 144, which is used when cartridge 10 is inverted is also visible. FIG. 11 is a detailed view of alignment feature 143, showing an oval portion 146, where the alignment pin initially enters alignment feature 143, and a V-shaped portion 148, against which the alignment pin abuts when cartridge 10 is lowered into its operational position in the disk drive.

Figure 12:
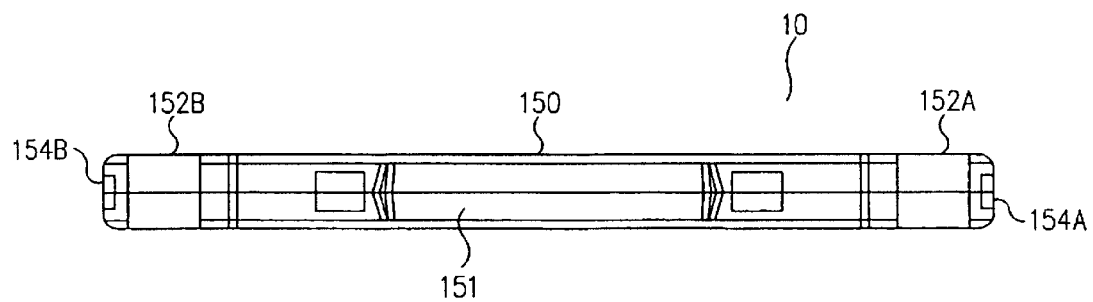
FIG. 12 is a view of the back edge of the cartridge.

Referring once again to FIG. 1, the back edge of cartridge 10 includes an arc-shaped portion 150, and shoulders 152A and 152B located on either side of arc-shaped portion 150. As described below, these features interact with the door of the disk drive during the load/unload sequence. Arc-shaped portion 150 includes a raised surface 151, shown in FIGS. 2 and 10, against which the user may press when loading cartridge 10 into disk drive 20. Along the side edges of cartridge 10 are eject limit slots 154A and 154B, respectively, and corresponding eject limit slot catches 156A and 156B at the end of eject limit slots 154A and 154B. FIG. 12 is a view of the back edge of cartridge 10, showing the arc-shaped portion 150, raised surface 151, shoulders 152A, 152B, and eject limit slots 154A, 154B.

Figure 13:
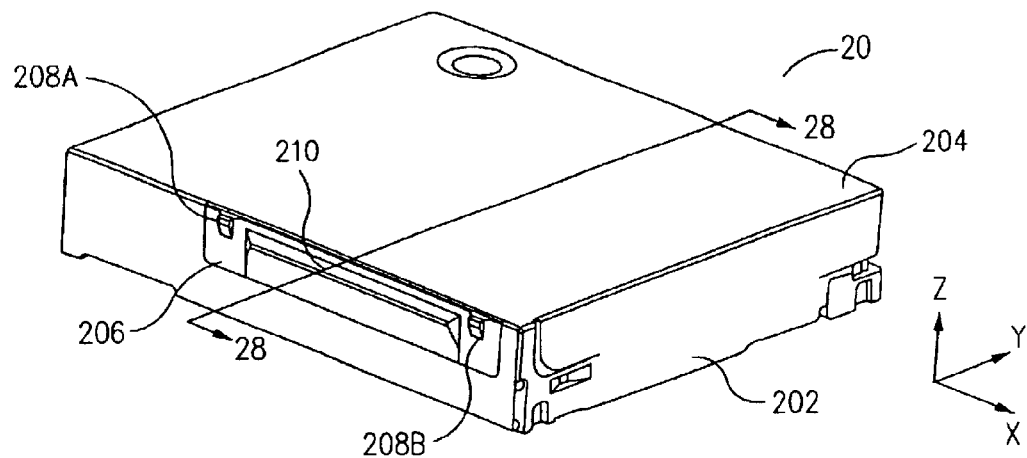
FIG. 13 is a perspective view of a disk drive in accordance with this invention.

FIG. 13 is a perspective view of a portable disk drive 20 that can be used to read or write data to or from optical disk 108 in cartridge 10. As previously stated, however, the principles of this invention are not limited to the specific cartridge described in FIGS. 1–12 but are applicable to a wide variety of cartridges Disk drive 20 includes a housing 202 and a cover 204. A spring-loaded door 206 is positioned at the entrance of the slot into which a cartridge is inserted. Door 206 is hinged at its lower edge, and a spring (not shown) biases door to the closed position shown in FIG. 13. On the outer surface of door 206 are a pair of cartridge catches 208A and 208B and a release cam 210. These features on door 206 interact with a cartridge as it is inserted into disk drive 20, as described below. Also shown in FIG. 13 is a set of axes that will be used in describing the operation of disk drive 20. The direction from left to right is defined as the positive X direction; the direction from the front to the rear of disk drive 20 is defined as the positive Y direction; and upward is defined as the positive Z direction. Of course, since disk drive 20 is portable, it can be operated while oriented in any direction.

Figure 14:
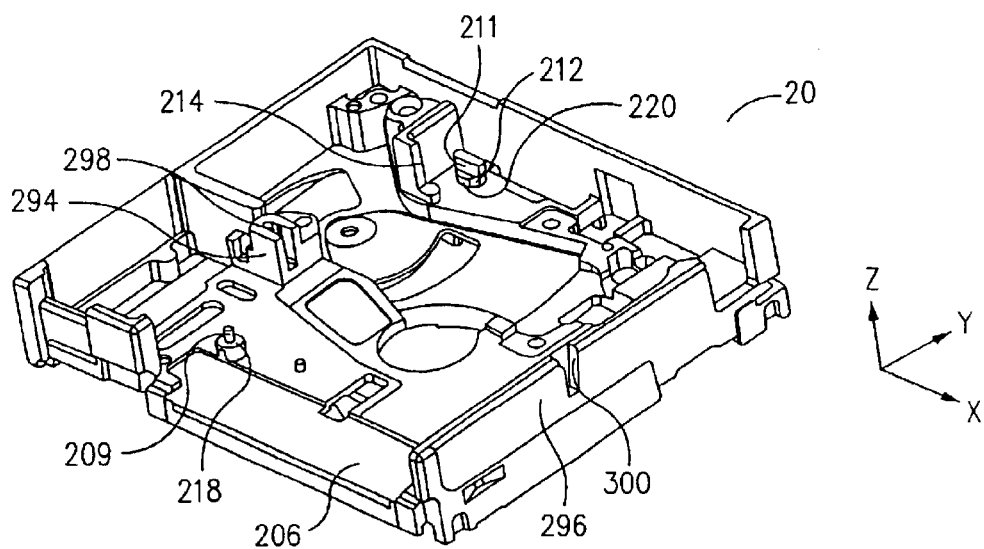
FIG. 14 is a perspective view of the inside of the disk drive housing with the internal components removed.
Figure 15:
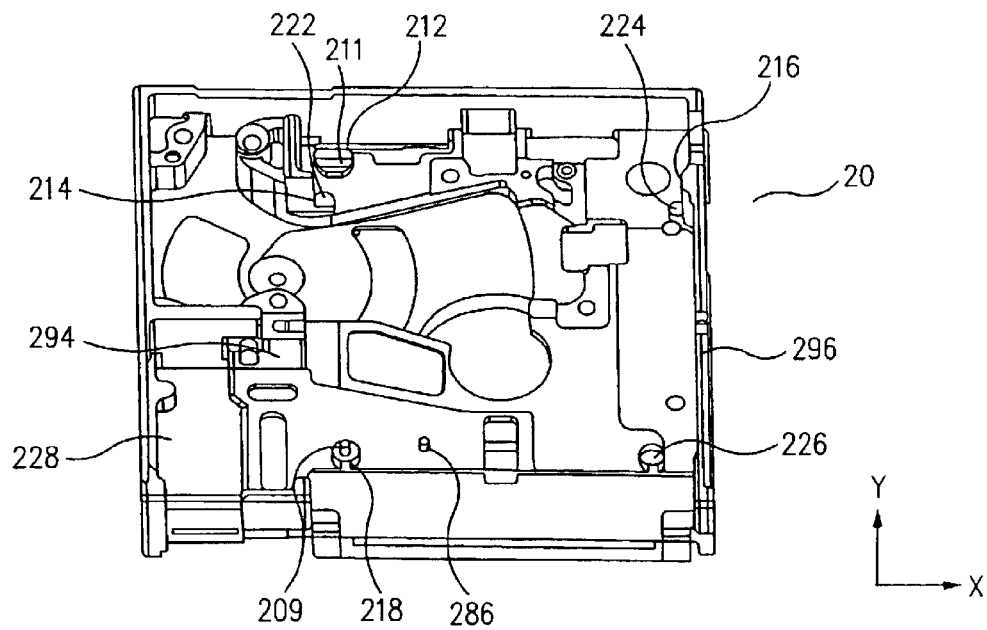
FIG. 15 is a tilted or inclined top view of the disk drive housing with the internal components removed.

FIGS. 14 and 15 show the interior of housing 202 with cover 204 and door 206 removed. Some of the internal components of disk drive 20, such as the actuator that holds the read/write head, are also omitted. The interior of housing 202 contains a number of datums, i.e., surfaces that are used to properly locate a cartridge for reading and writing. An XY alignment pin 209 and a Y limiter 211 on a backstop 212 help locate the cartridge in the XY plane. Theta datum 214 controls the theta (rotational) position of the cartridge in the XY plane and theta limiter 216 limits the theta rotation of the cartridge in the clockwise direction during the load cycle.

As shown in FIGS. 14 and 15, there are five datums that locate the cartridge in the Z dimension: an annular surface 218 located at the base of XY alignment pin 209; a surface 220 at the base of backstop 212; surfaces 222 and 224 at the base of theta datum 214 and theta limiter 216, respectively; and a surface 226 in the front right area of housing 202. In this embodiment, Z datums 220 and 222 are relatively close together and function as a single datum.

Housing 202 also contains a cavity 228 for mounting a cartridge load/unload motor and lead screw mechanism 229 (shown in FIG. 33A) that provides the mechanical power to lower cartridge 10 into operating position.

Figure 16:
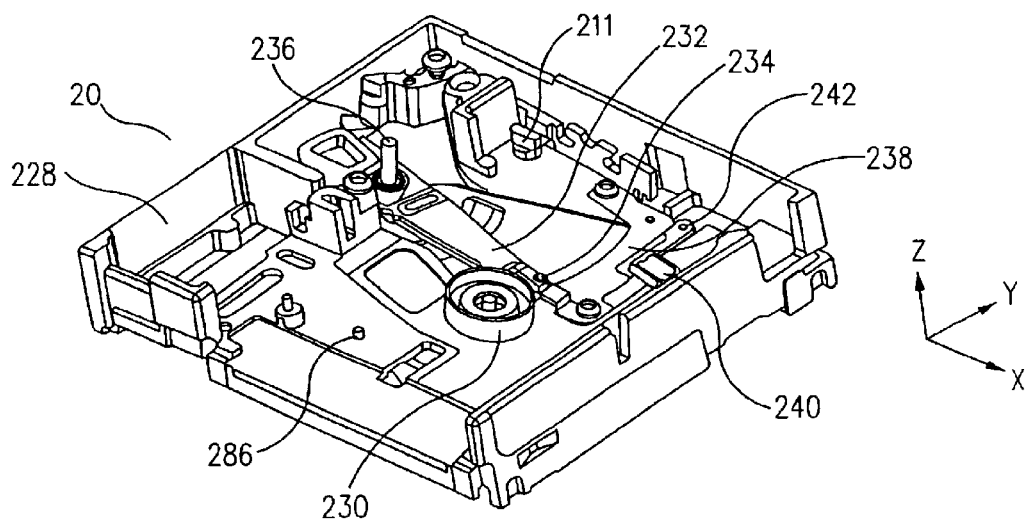
FIG. 16 is a perspective view of the inside of the disk drive housing with some of the internal components present.

FIG. 16 is another view of the interior of housing 202, showing the locations of several components that are omitted from FIGS. 14 and 15. In particular, FIG. 16 shows the locations of a spindle motor 230, which makes contact with an optical disk within cartridge 10, an actuator arm 232, which holds an optical pickup unit (OPU) 234 for reading and writing to or from optical disk 108, a pin 236 about which actuator arm 232 rotates to position OPU 234 over a data track on the disk that is to be written to or read from, a crash stop 238, which prevents contact between OPU 234 and the surface of the optical disk, and a parking mechanism 240, which pivots about a pin 242 to "park" actuator arm 232 when OPU 234 is not reading or writing data.

Figure 17:
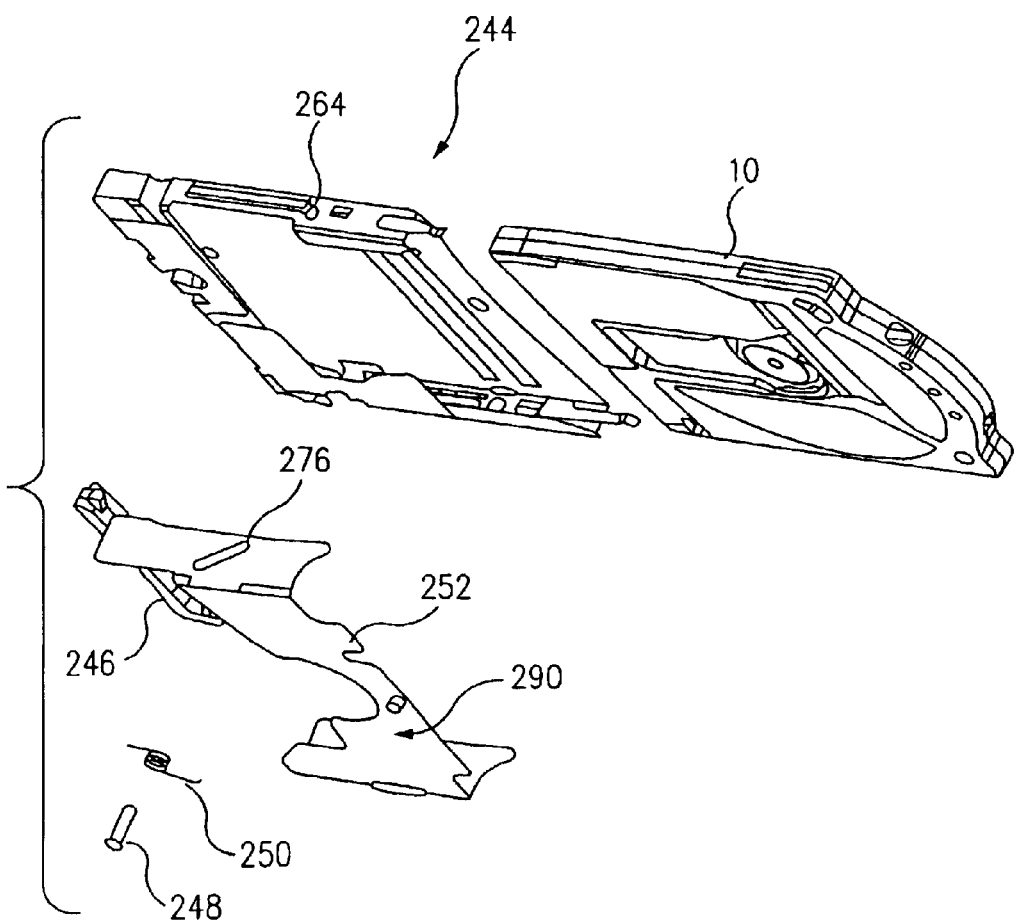
FIGS. 17 and 18 are exploded views of the cartridge, the cartridge tray and the cam plate.
Figure 18:
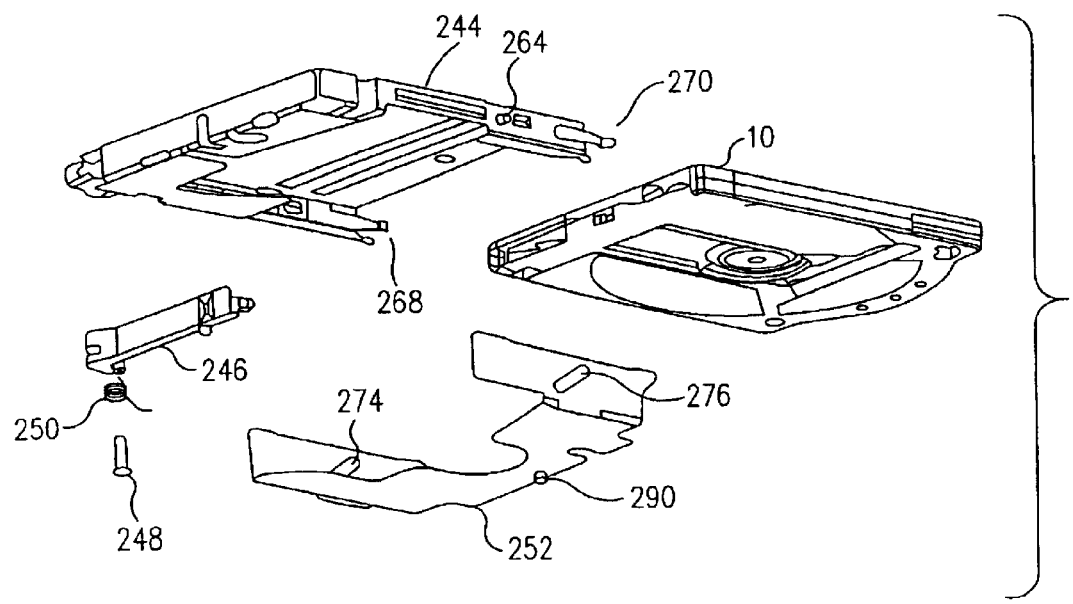

When cartridge 10 is introduced to disk drive 20, it enters a cartridge tray 244, shown in the exploded view of FIG. 17. Associated with cartridge tray 244 is a cam plate 252. These components are shown from a different perspective in the exploded view of FIG. 18.

Figure 19A:
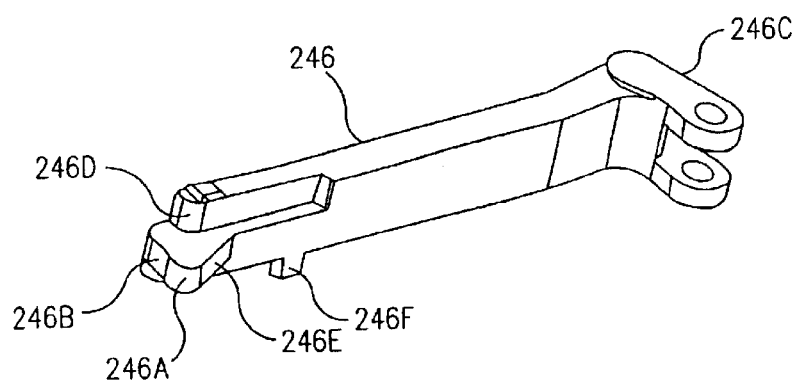
FIG. 19A is a perspective view of the picker arm from below.
Figure 19B:
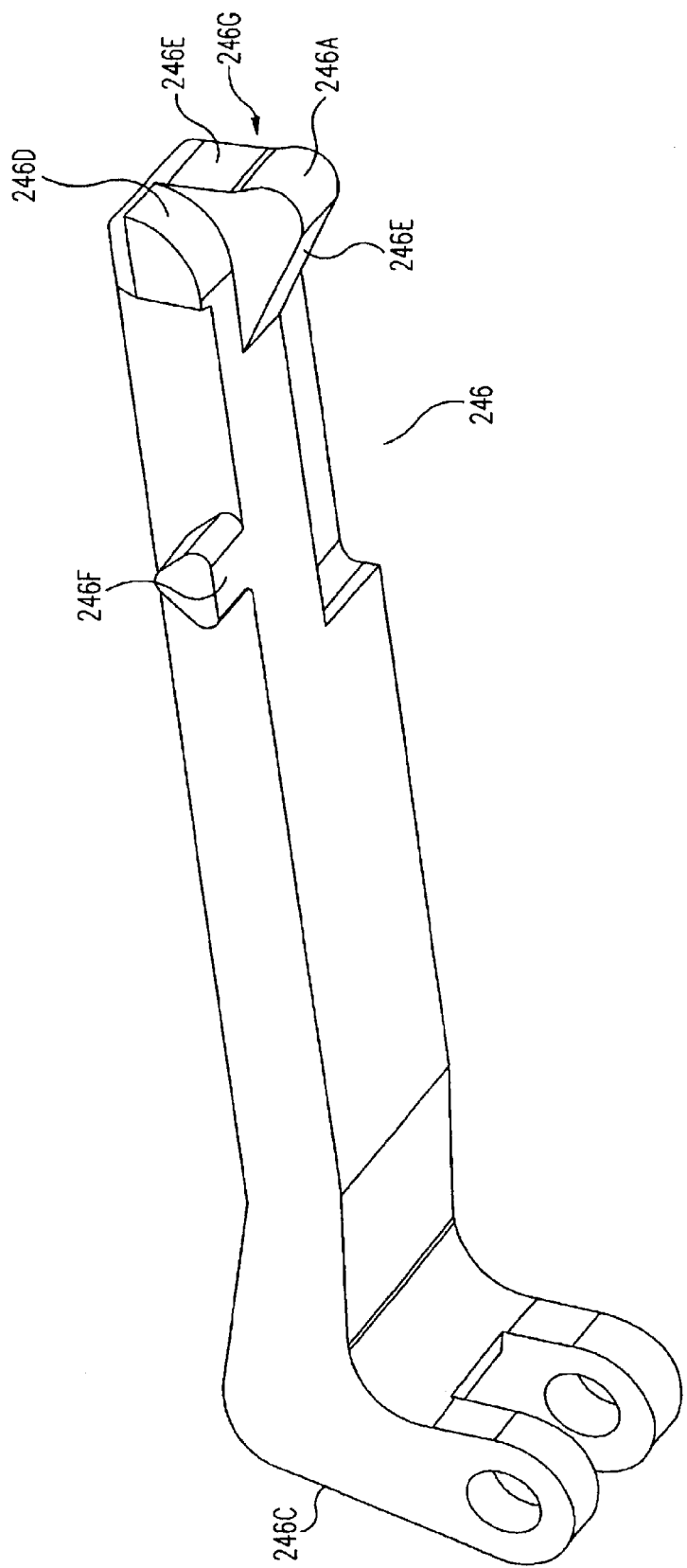
FIG. 19B is a perspective view of the picker arm from above.

Mounted in cartridge tray 244 is a picker arm 246, which rotates about a pin 248 and is biased by a spring 250. Spring 250 biases picker arm 246 into an extended position wherein picker arm points generally in a direction towards door 206 of disk drive 20. Picker arm 246 is shown in FIGS. 19A and 19B. Picker arm 246 includes a protrusion 246A and a shutter opening surface 246B, which are shown in detail in FIG. 19C.

Figure 20:
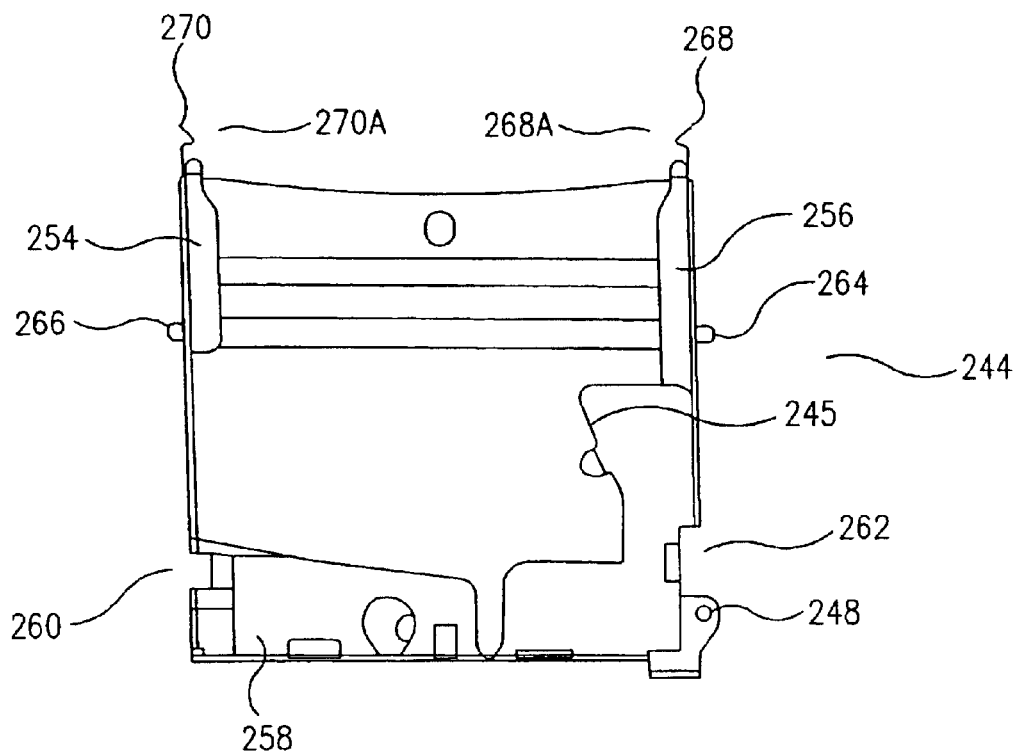
FIG. 20 is a bottom view of the cartridge tray.

A bottom view of cartridge tray 244 is shown in FIG. 20. As indicated, the bottom of tray 244 is substantially open, thereby allowing OPU 234 to obtain access to optical disk 108. Cartridge 10 is held in tray 244 by side flanges 254 and 256, which with the top of tray 244 form opposing channels into which cartridge 10 slides until the front edge of cartridge 10 is enclosed by a flange 258. Tray 244 has openings at selected positions to allow the X, Y, Z and theta datums in housing 202 (described above) to make contact with cartridge 10 while it is positioned in tray 244. For example, openings 260 and 262 on the sides of tray 244 allow theta datum 214 and theta limiter 216 to make contact with the side edges of cartridge 10. Tray pins 264 and 266 project from the sides of tray 244, and eject limiters 268 and 270 are positioned near the entrance to tray 244. Eject limiters 268, 270 are made of a resilient material such as spring steel and are bent to form protrusions 268A, 270A. Pin 248, about which picker arm 246 (not shown) rotates, is also shown in FIG. 20.

Figure 21:
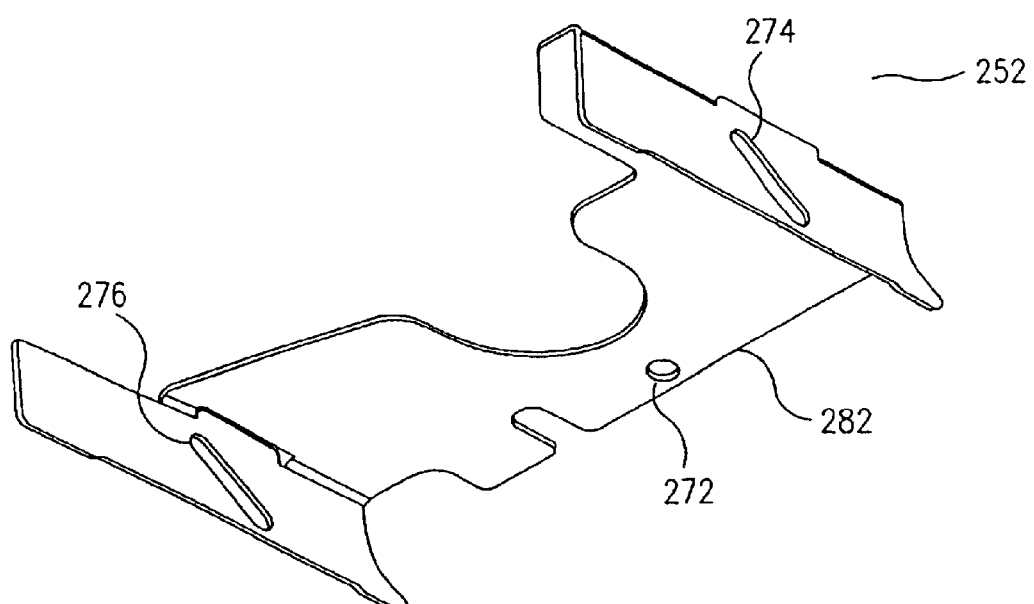
FIG. 21 is a perspective view of the cam plate.
Figure 22:
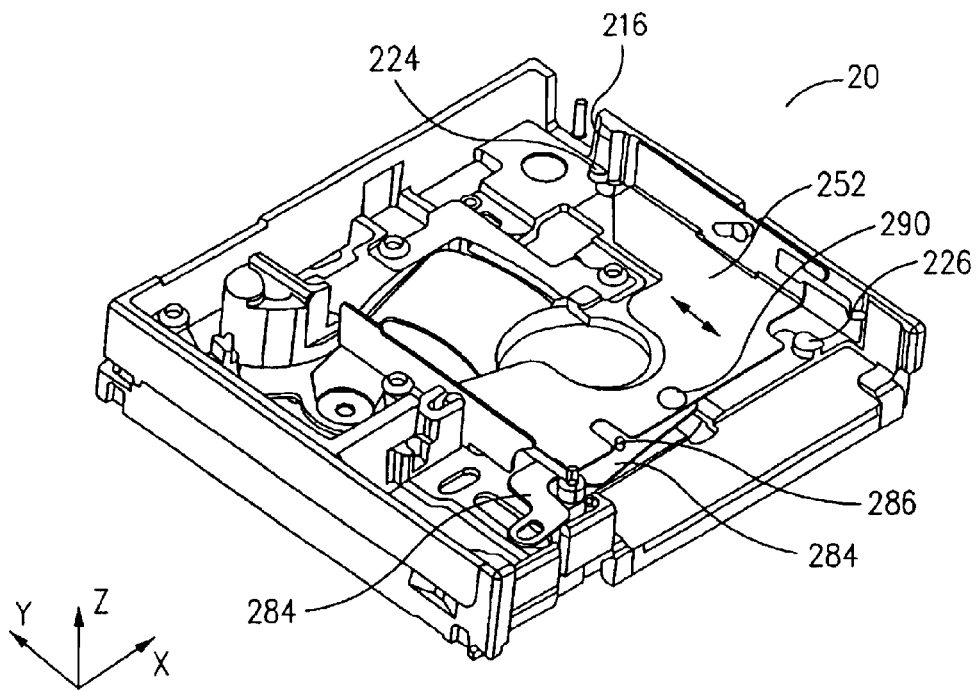
FIGS. 22 and 23 are perspective views of the disk drive housing with the cam plate and lever arm in place.
Figure 23:
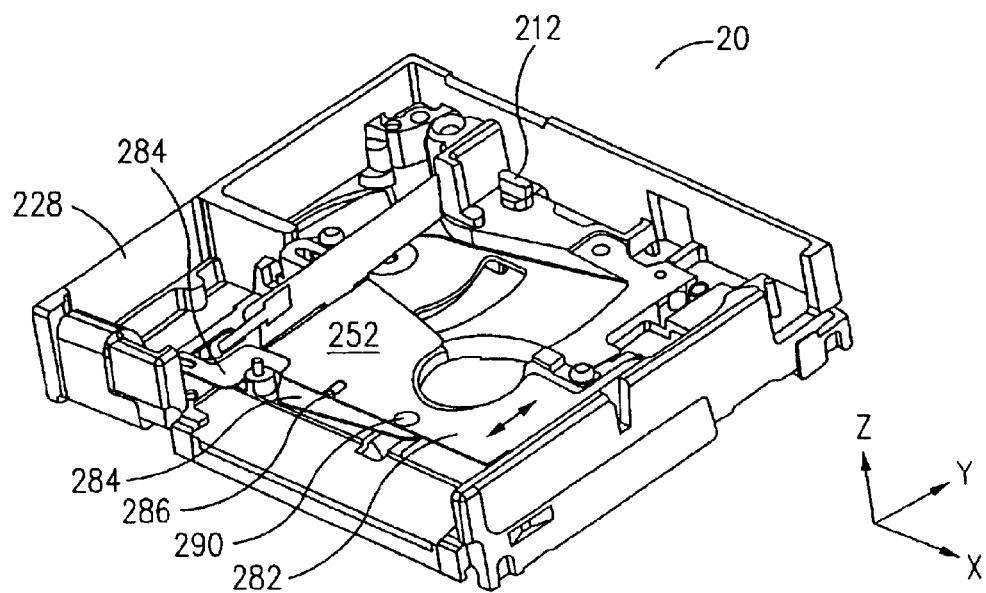
Figure 24:
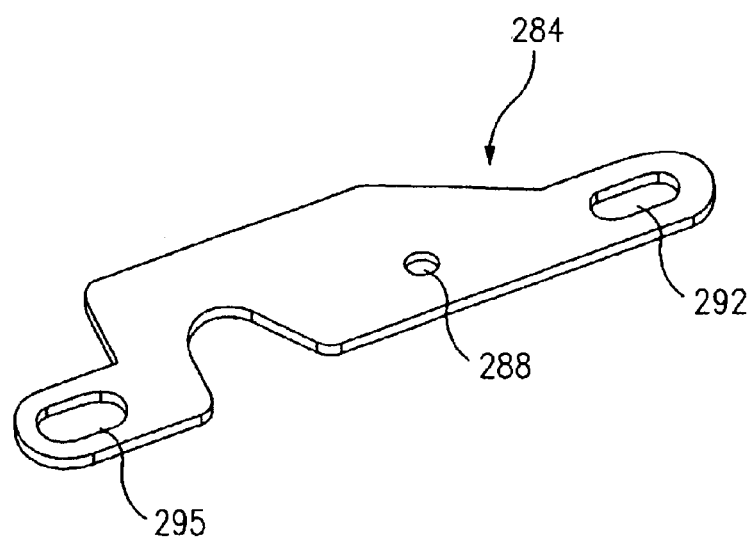
FIG. 24 is a perspective view of the lever arm.
Figure 25:
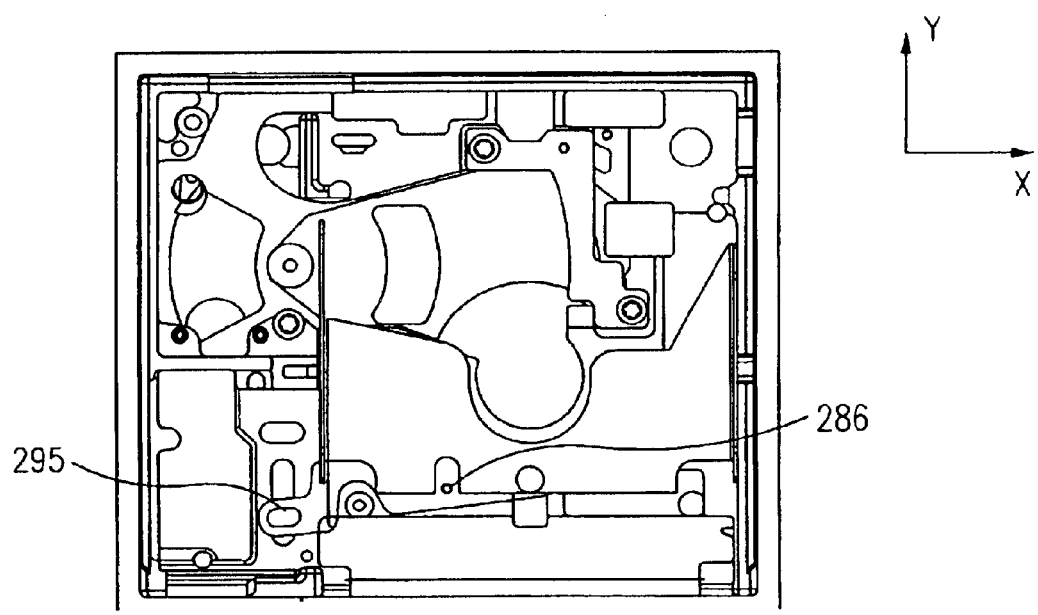
FIG. 25 is a top view of the disk drive housing with the cam plate and lever arm in place.

Cam plate 252 is shown in detail in FIG. 21. If particular note are an aperture 272 and cam slots 274 and 276, positioned on the side flanges 278 and 280 of cam plate 252, through which tray pins 264 and 266 extend. When cam plate 252 is mounted in disk drive 20, main body portion 282 is positioned against the floor of housing 202, as shown in FIGS. 22 and 23. Also shown in FIGS. 22 and 23 is a lever arm 284 which rotates about a pin 286 in housing 202 (see FIGS. 15 and 16). Lever arm 284 is shown in isolation in FIG. 24. An aperture 288 of lever arm 284 fits over pin 286 of housing 202 (see FIGS. 15 and 16). A cam plate pin 290 is inserted through a slot 292 of lever arm 284 and aperture 272 of cam plate 252. Referring to FIG. 25, a pin 328 (shown in FIG. 42) is inserted through slot 295 to form a connection with the cartridge load/unload motor and lead screw mechanism 229 that is mounted in cavity 228. Thus, as the cartridge load/unload motor drives the lead screw mechanism back and forth between its limits, lever arm 284 rotates clockwise and counterclockwise about pin 286, and this in turn causes cam plate 252 to slide forward and backward along the Y axis in housing 202, as cam plate pin 290 slides in slot 292. This motion is shown by the arrows in FIGS. 22 and 23.

Figure 26:
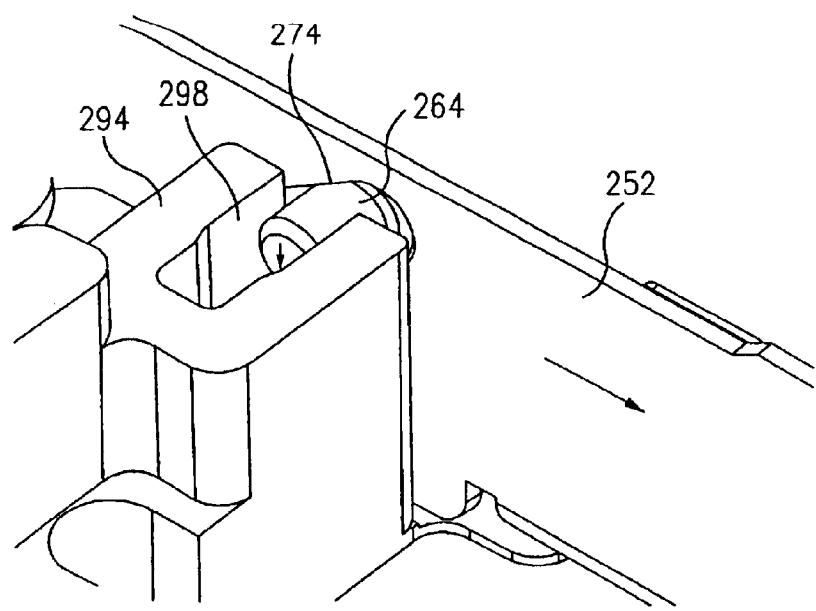
FIG. 26 is a detailed perspective view showing how a cartridge tray pin interacts with the cam plate and one of the tray pin slots.

Referring back to FIG. 14, on either side of housing 202 are X limiters 294 and 296, which contain tray pin slots 298 and 300, respectively. Tray pins 264 and 266 extend through cam slots 274 and 276 of cam plate 252. Tray pin 264 extends into tray pin slot 298; tray pine 266 extends into tray pin slot 300. FIG. 26 is a detailed view showing tray pin 264, cam slot 274 and tray pin slot 298. It will be evident from FIG. 26 that, as cam plate 252 moves back and forth in housing 202, as described above, the juxtaposition of cam slots 274, 276 and tray pin slots 298, 300 causes tray pins 264, 266 to move upwards and downwards in tray pin slots 298, 300. The position of tray pin 264 near the top of tray pin slot 298 in FIG. 26 reflects the condition before a cartridge has been inserted into disk drive 20.

Figure 27:
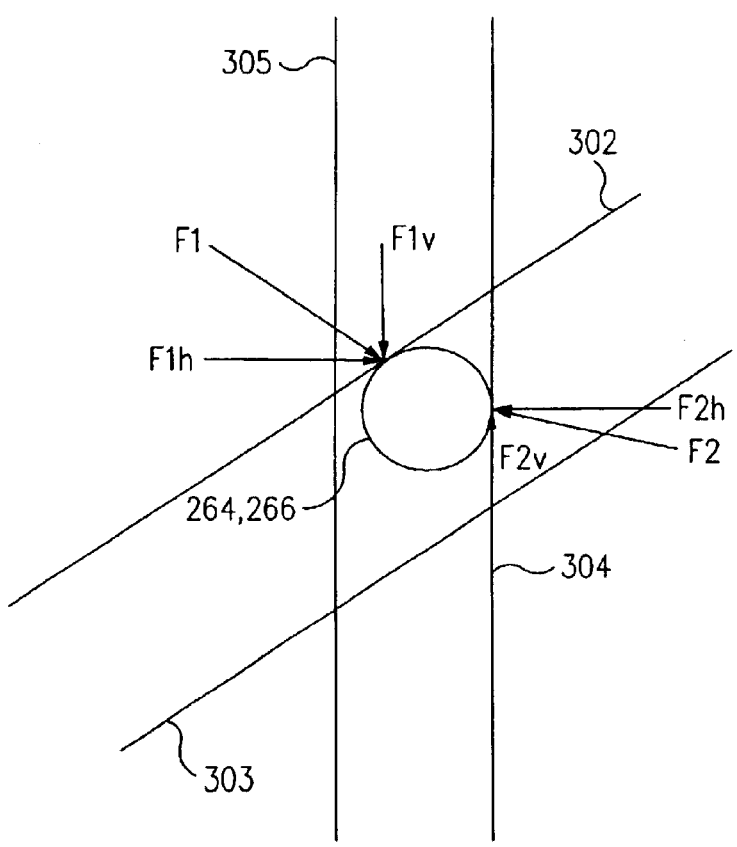
FIG. 27 is a vector diagram showing the force on the cartridge tray pin.

The combined effect of cam slots 274, 276 and tray pin slots 298, 300 on tray pins 264, 266 is further illustrated in FIG. 27, which shows that the forces F1 and F2 on pins 264, 266. Force F1 is created by edge 302 of cam slots 274, 276 of cam plate 252 when cam plate 252 is moved horizontally to the right. Force F2 is created by edge 304 of tray pin slots 298, 300. The horizontal component F2$h$ of force F2 is equal and opposite to the horizontal component F1$h$ of force F1, and thus tray pins 264, 266 are prevented from moving horizontally. The vertical component F2$v$ of force F2 is less than the vertical component F1$v$ of force F1, and thus tray pins 264, 266 are forced to move vertically downward. It will be understood that when cam plate 252 moves in the opposite direction, edge 303 of cam slots 274, 276 and edge 305 of tray pin slots 298, 300 apply forces to tray pins 264, 266. In this case, the horizontal forces are again canceled, but the vertical forces now are greater in the upward direction. Thus tray pins 264, 266 are forced to move upward.

In one embodiment, cam slots 274, 276 are angled at 38.5 degrees with respect to a main body portion 282 of cam plate 252 and about 51.5 degrees to tray pin slots 298, 300.

The load/unload sequence will now be described, with reference to FIGS. 28–41. The movement of cartridge 10 during the load/unload sequence is summarized in FIG. 41, which indicates that seven stages are involved.

Figure 28:
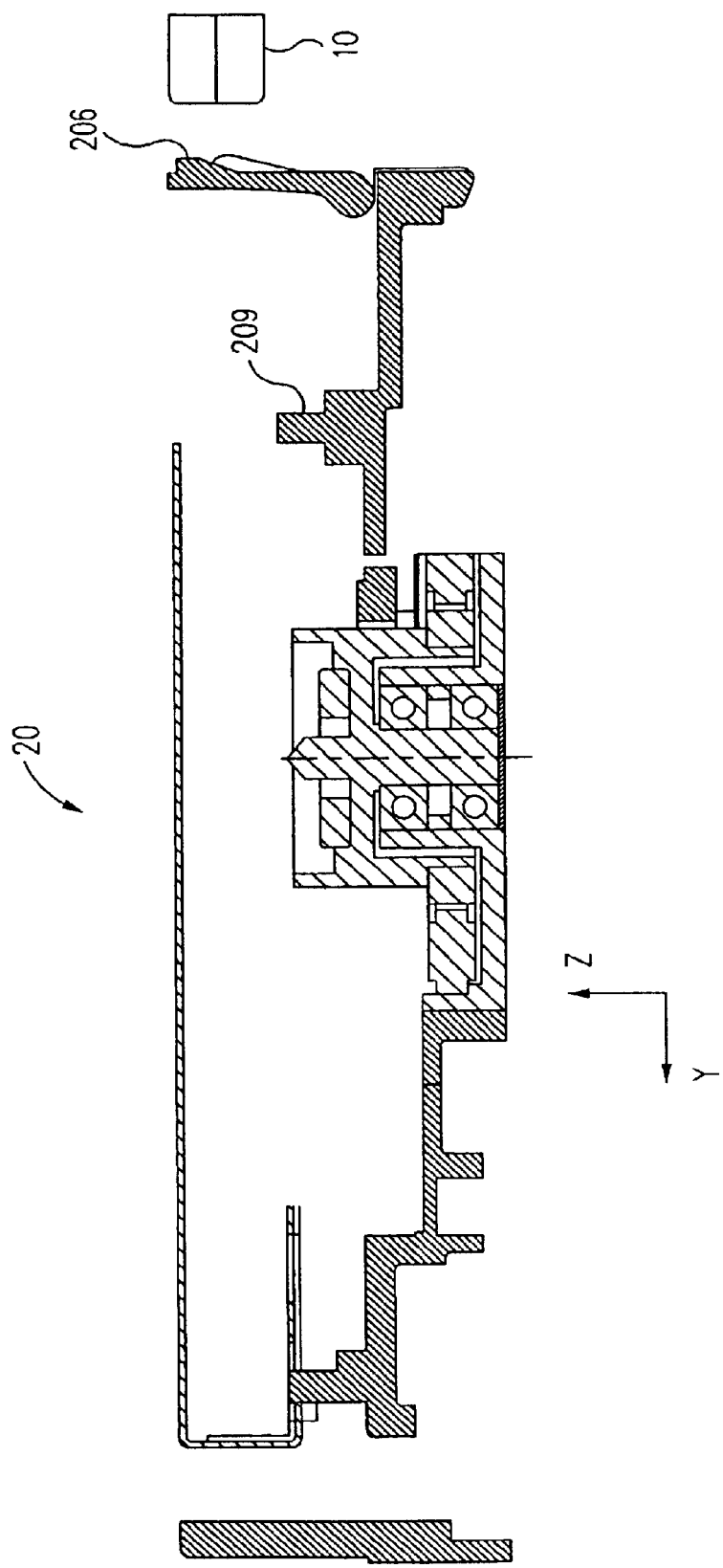
FIG. 28 is a cross-sectional view of the disk drive and a cartridge about to be inserted.
Figure 29:
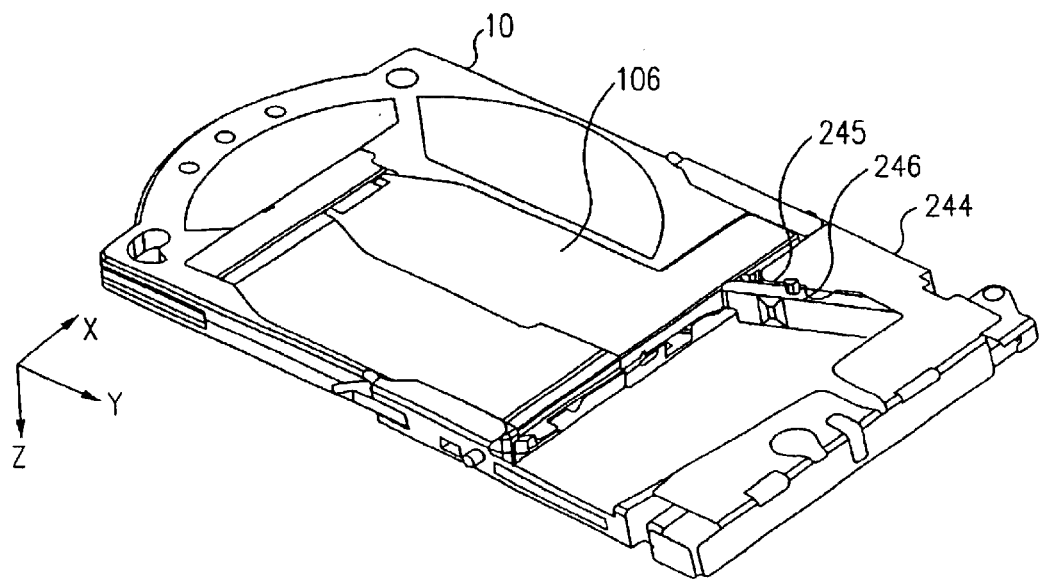
FIGS. 29 and 30 are perspective views showing the cartridge partially inserted into the cartridge tray.
Figure 30:
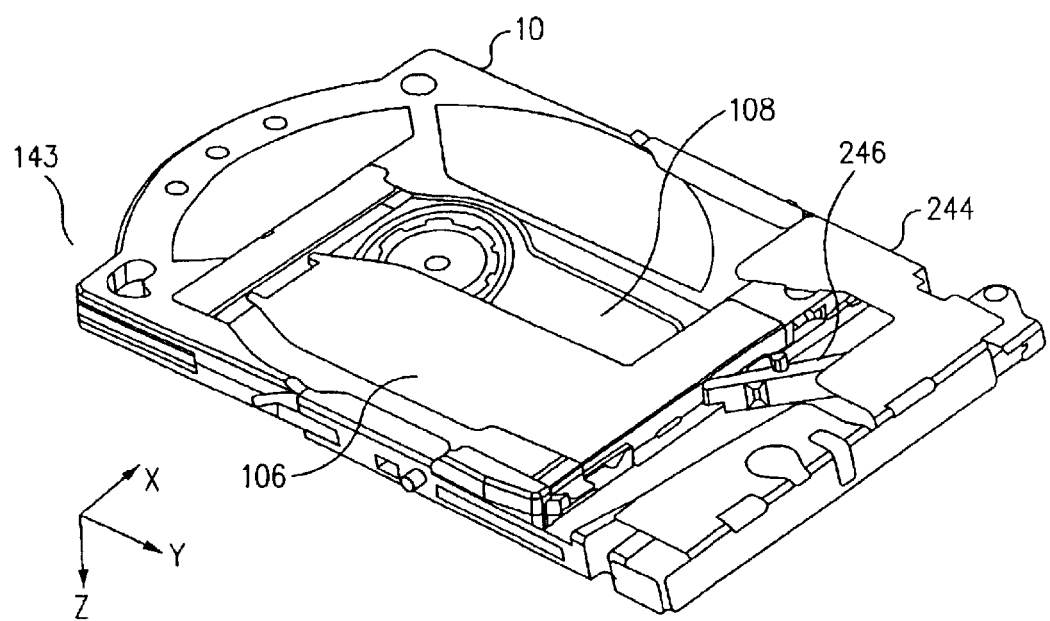

FIG. 28 is a cross-sectional view, taken at section 28—28 in FIG. 13, which shows cartridge 10 just before it is inserted into disk drive 20. FIG. 29, a perspective view of cartridge 10 and cartridge tray 244 taken from the underside of cartridge tray 244, shows cartridge 10 after it has been partially inserted in disk drive 20 by a user and shows picker arm 246 in its extended position just making contact with wedge portion 134 of shutter lock 128. The protrusion 246A of picker arm 246 depresses wedge portion 134 of shutter lock 128, thereby causing shutter lock 128 to release shutter 106 and shutter opening surface 246B of picker arm 246 makes contact with contact edge 122 of shutter 106 (see FIGS. 19A and 19B). FIG. 30 shows the condition an instant later, when shutter 106 has partially opened, exposing a portion of optical disk 108. Through this point, the power to insert cartridge 10 has been provided entirely by the user. Once picker arm 246 starts to open shutter 106, the further insertion of cartridge 10 is resisted by shutter return spring 140 and picker arm spring 250. The combined resistance of these two springs is minimal, however, from the standpoint of the user.

The angle of picker arm 246 relative to the front edge of shutter 106 as cartridge 10 is inserted should not be too large because otherwise friction between shutter 106 and cartridge housing 102 may be so great as to inhibit or prevent shutter 106 from opening. The opening force applied to shutter 106 by shutter opening surface 246B must overcome the frictional force between shutter 106 and housing 102. Therefore, picker arm 246 contains an offset portion 246C which reduces the effective angle between picker arm 246 and the front edge of shutter 106. FIG. 19D shows the relationship between shutter 106 and picker arm 246 at the point of initial contact. The angle $\alpha$ represents tie effective angle between picker arm 246 and front edge 106E of shutter 106 if there were no offset 246C and the pivot point of picker arm 246 were located at point 249. The angle $\beta$ represents the effective angle between picker arm 246 and front edge 106E with the pivot point located at pin 248. As indicated, angle $\beta$ is smaller than angle $\alpha$.

Moreover, when shutter 106 is fully open, the effective angle between picker arm 246 and front edge 106E of shutter 106 should be as small as possible. Offset portion 246C also minimizes this angle. Shutter 106 should be opened to a repeatable position to provide operating clearance to internal components of disk drive 20. The small angle minimizes the sensitivity of the open position of shutter 106 to small motions of cartridge 10 in the Y dimension, which can be caused by manufacturing tolerances of the parts and by the expected motion of cartridge 10 as it becomes seated against XY alignment pin 209, as described below. The presence of offset 246C also provides clearance for cartridge 10 when cartridge 10 is fully inserted in disk drive 20.

Figure 19C:
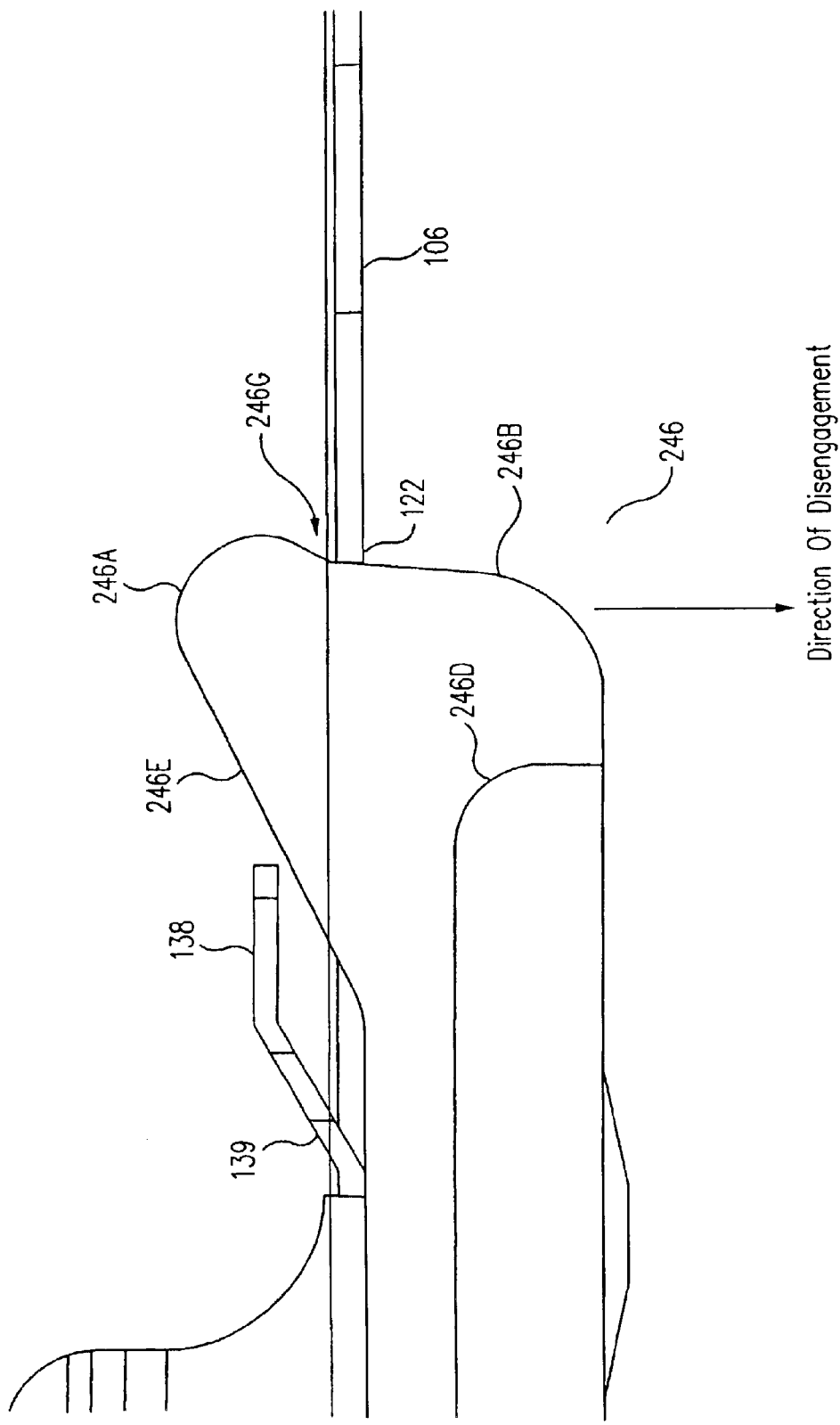
FIG. 19C is a view of the end of the picker arm and the shutter when the shutter is in an open position.
Figure 19D:
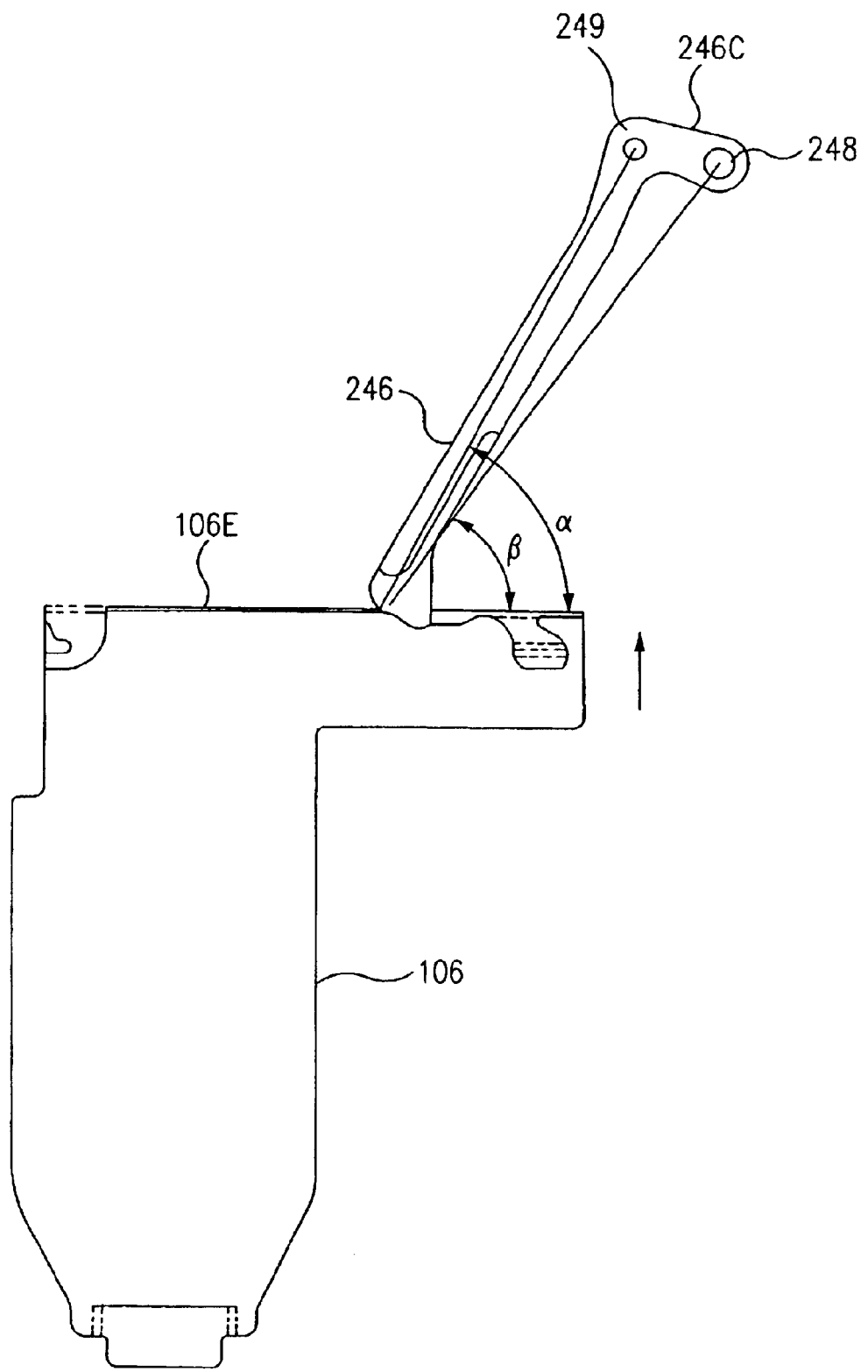
FIG. 19D illustrates the reduction of the effective angle between the picker arm and the front edge of the shutter as result of the offset in the picker arm.

Picker arm 246 also includes a guide surface 246D, shown in FIGS. 19A–19C, which provides a smooth, rotating interface between picker arm 246 and a surface 141 of shutter 106 (shown in FIG. 3B) and prevents protrusion 246A from sliding against the interior plastic of cartridge 10. This guiding action reduces the friction between picker arm 246 and shutter 106. This reduced friction in turn reduces the force required to insert protrusion 246A into shutter 106 and provides a smooth "feel" for the insertion.

As shown in FIG. 19C, protrusion 246A "overhangs" shutter opening surface 246B, creating a bend or inflection point 246G at the junction of protrusion 246A and shutter opening surface 246B. Inflection point 246G provides a positive locking force against contact edge 122 of shutter 106 when shutter 106 is in its fully open position (as shown in FIG. 2) and prevents picker arm from becoming disengaged from shutter 106 as a result of shock or vibration.

Still referring to FIGS. 19A'19C, protrusion 246A has a angled back wall 246E which engages locking tab 138 of shutter 106 when shutter 106 is in its fully open position (see FIGS. 8 and 9). As a result of this contact, when cartridge 10 is to be removed from disk drive 20, back wall 246E provides a positive closing force against shutter 106 and thereby prevents shutter 106 from becoming "stuck" in the fully open position. Once shutter 106 begins to close, shutter return spring 140 takes over.

Picker arm 246 also includes a stop surface 246F which abuts a corresponding stop surface 245 on cartridge tray 244

(see FIGS. 20 and 29), thereby holding picker arm 246 in the correct position when disk drive 20 is empty such that protrusion 246A properly engages shutter lock 128 and shutter 106 when cartridge 10 is inserted into disk drive 20. The position of picker arm 246 before cartridge 10 is inserted into disk drive 20 is purposely set such that picker arm 246 engages shutter 106 at a surface 139, in advance of opening 120 of shutter 106 (see FIG. 3B). As a result, picker arm 246 engages shutter lock 128 and contact edge 122 of shutter 106 with a "sweeping motion". Positioning stop surface 245 so as to achieve this result adds a margin of error to ensure that picker arm 246 properly engages shutter lock 128 and shutter 106.

Figure 32:
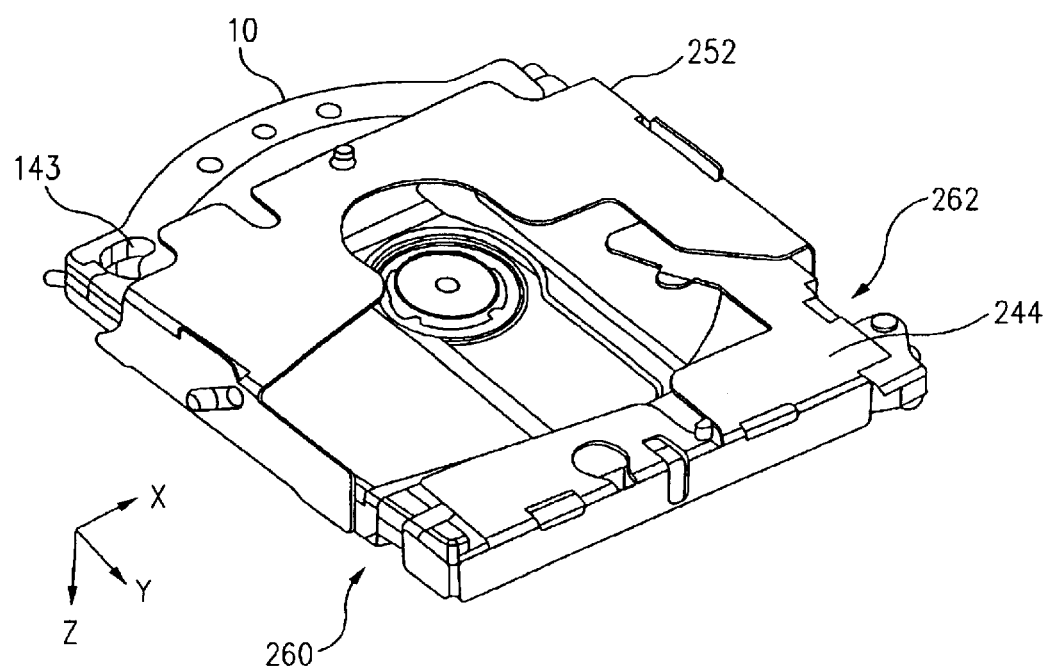
FIG. 32 is a perspective view of the cartridge fully inserted into the cartridge tray and cam plate.

FIG. 31A is a cross-sectional view similar to FIG. 28 showing cartridge 10 fully inserted into cartridge tray 244. Picker arm 246 has been rotated against the force of picker arm spring 250 until it is in a retracted position, in this embodiment substantially flat against the back of tray 244. Shutter 106 (not shown) has been fully opened. Importantly, as shown in the detailed view of FIG. 31B, cartridge catches 208A and 208B on door have engaged shoulders 152A and 152B of cartridge 10 (see FIG. 1), thereby preventing cartridge 10 from being ejected from disk drive 20 by the forces from picker arm spring 250 and shutter return spring 140. FIG. 32 is a perspective view from the bottom showing cartridge 10 fully inserted into cartridge tray 244. Cam plate 252 is also shown.

Figure 41:
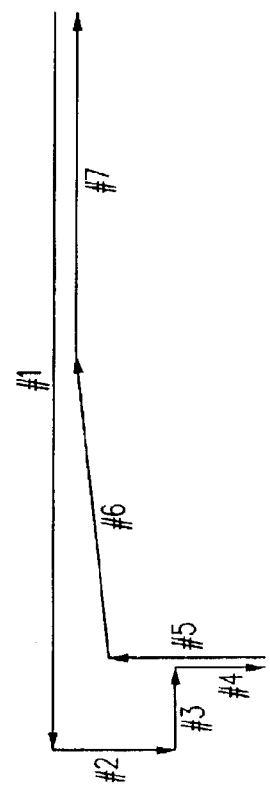
FIG. 41 is a schematic diagram (not drawn to scale) summarizing the movement of the cartridge during the load/unload sequence.

The insertion of cartridge 10 to the position shown in FIGS. 31A, 31B and 32 is represented as motion #1 in FIG. 41.

Figure 33A:
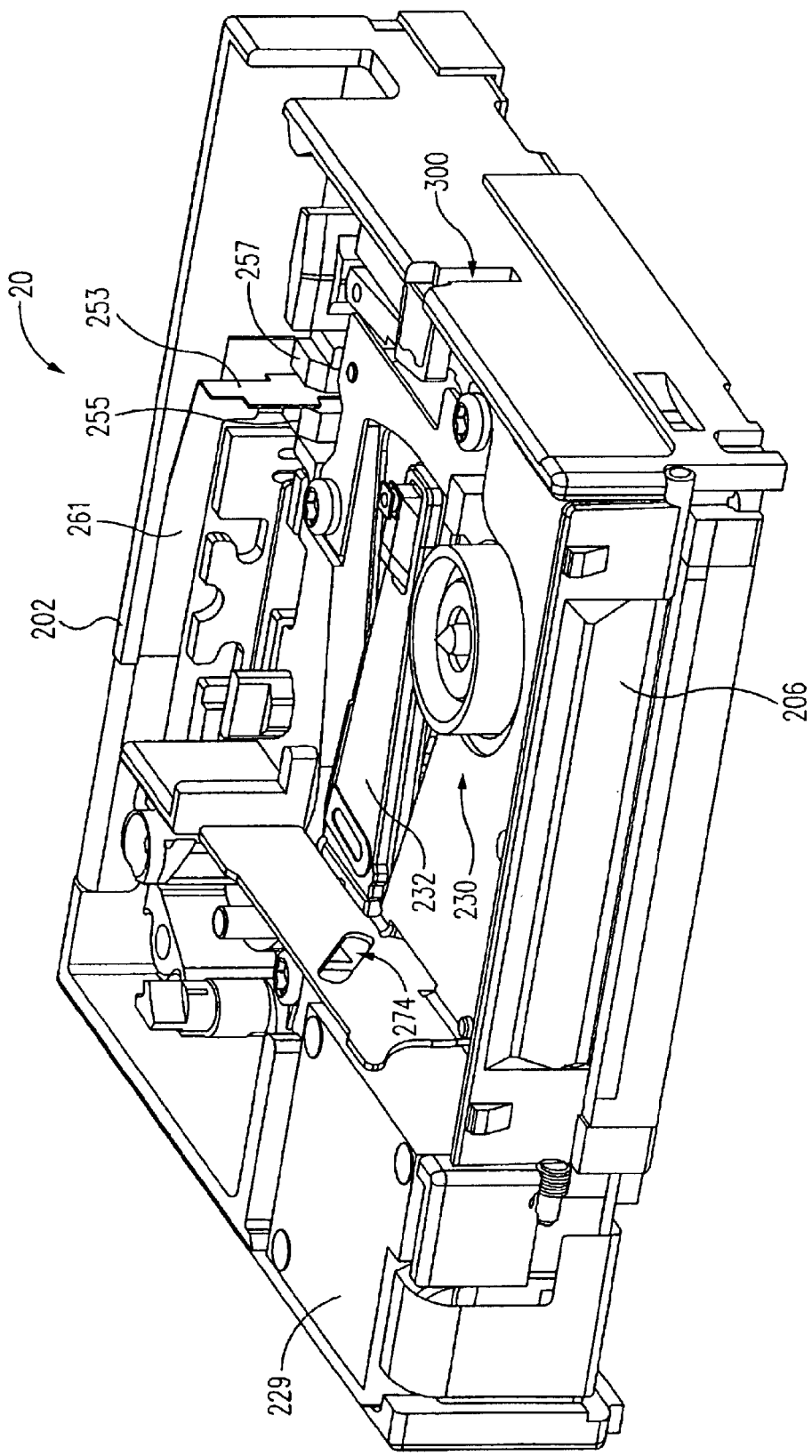
FIG. 33A is a perspective view of the disk drive with several components removed to illustrate several underlying exemplary components.
Figure 33B:
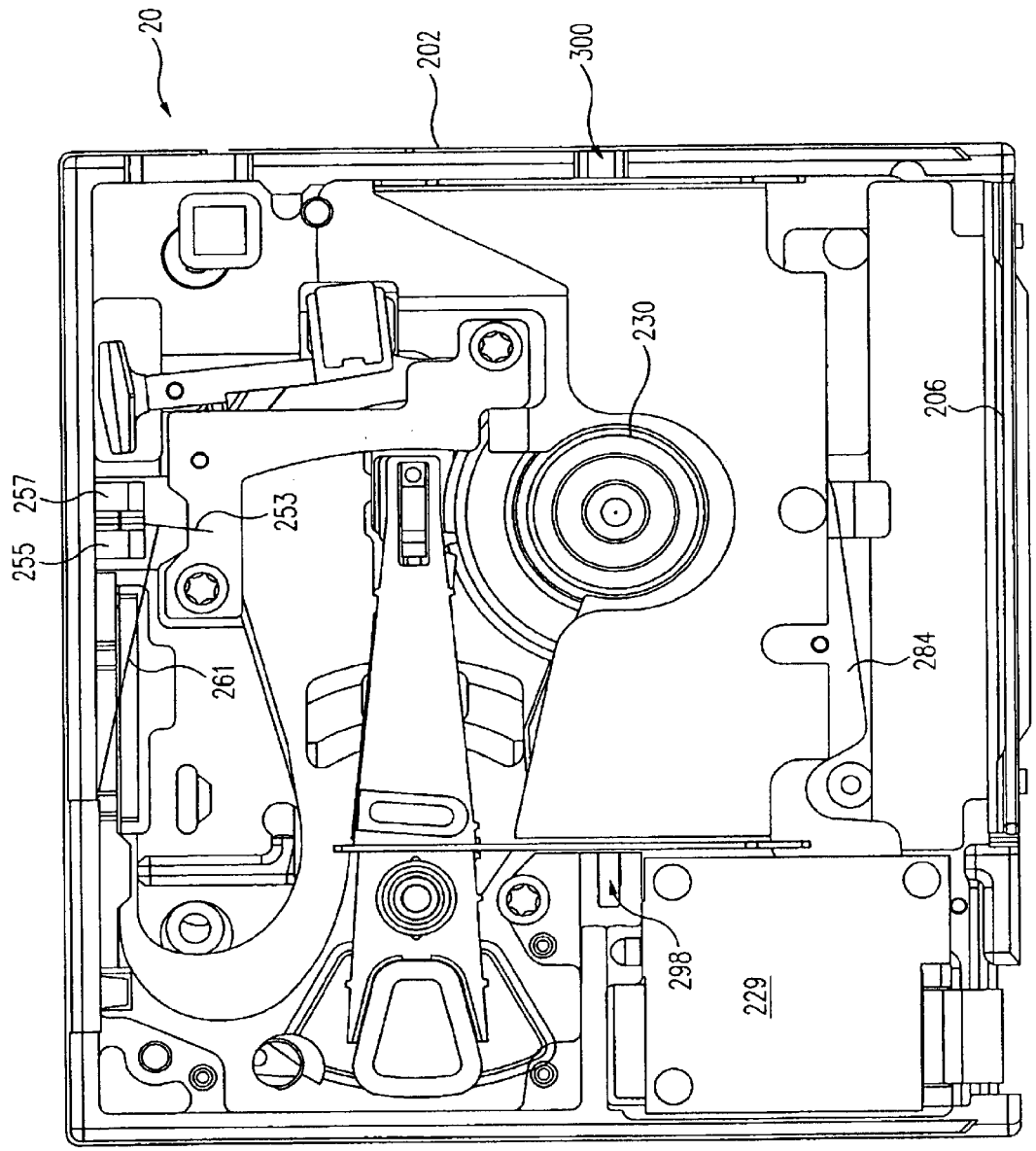
FIGS. 33B and 33C are top views of the system shown in FIG. 33A.
Figure 33C:
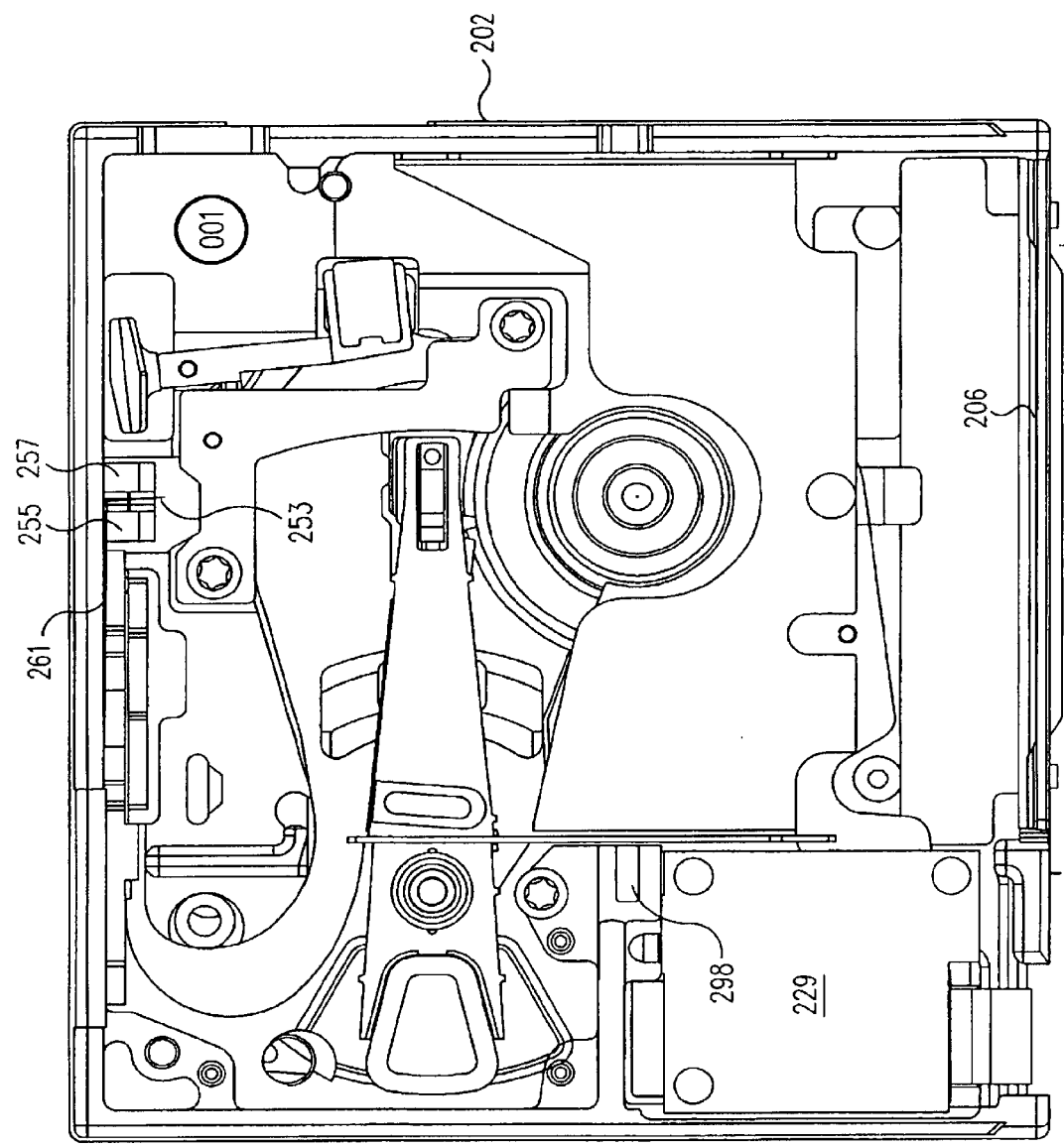

At this point, as shown in FIGS. 33A–33C, cartridge 10 causes a shield or flag 253 to interrupt a light beam generated by a light-emitting diode (LED) 255. This, in turn, is detected by a light sensor 257, which sends a signal that activates cartridge load/unload motor and lead screw mechanism 229.

FIG. 33A is a perspective view of disk drive 20 with cartridge tray 244 removed. FIGS. 6B and 6C are top views of disk drive 20. In particular, FIGS. 6A–6C show flag 253 mounted to housing 202 via a flag spring 261. The combination of flag 253 and flag spring 261 need not be mounted to housing 202 as shown in FIGS. 6A-6C. As shown in application Ser. No. 60/265,830, filed Jan. 31, 2001, entitled Cartridge Loading Mechanism for Data Storage Disk, the flag and flag spring may be mounted to the tray. The remaining description will presume that flag 253 and flag spring 261 are mounted to housing 202 as shown in FIGS. 6A–6C.

Flag 253 may be formed from an opaque material. In a preferred embodiment, flag spring 261 is formed from a metal or other flexible material and includes first and second ends. The first end of flag spring 261 may be fixedly connected to housing 202 using, for example, an adhesive or a weld. The second end of flag spring 261 is connected to flag 253. In one embodiment, flag 253 and flag spring 261 are formed from the same piece of flat metal such that flag 253 is integrally connected to flag spring 261. As will be more fully described below, flag 253 is movable between beam interruption and beam allowance positions. FIGS. 6*a* and 6*b* show flag 253 in the beam interruption position, and FIG. 6*c* shows flag 253 in the beam allowance position. Flag 253 is biased to the beam allowance position by flag spring 261.

LED 255 and a light sensor 257 are mounted to housing 202 via a printed circuit board (not shown). The combination of flag 253, LED 255 and a light sensor 257 represents one embodiment of a device for detecting the presence of cartridge 10 in disk drive. LED 255, when active, generates a light beam between LED 255 and light sensor 257. Light sensor 257, when active, generates a signal in response to receiving the light beam generated by LED 255 or in response to an interruption of the light beam generated by LED 255. The remaining description will presume that light sensor 257 generates a signal in response to an interruption of a light beam generated by LED 255.

Flag 253 is movable between the beam-interruption position and the beam allowance position. In the beam-interruption position, as shown in FIGS. 33A and 33B, flag 253 is positioned between LED 255 and light sensor 257 so that flag 253 interrupts the beam of light received by sensor 257. In other words, flag 253 shields sensor 257 from receiving light from LED 255 when flag 253 is in the beam-interruption position. In the beam allowance position, as shown in FIG. 6C, flag 253 is removed from between LED 255 and light sensor 257 so that light sensor 257 may receive the light beam generated by LED 255.

Flag 253 is normally in the beam allowance position and is moved from its beam allowance position to its beam-interruption position when cartridge 10 is fully inserted into cartridge tray 244. In one embodiment, cartridge 10 directly or indirectly engages and moves flag 253 into its beam-interruption position when cartridge 10 is inserted into tray 244. Cartridge 10 indirectly engages and moves flag 253 into its beam-interruption position when cartridge 10 is inserted into tray 244. When cartridge 10 is removed from tray 244, flag spring 261 returns flag 253 to its beam allowance position shown in FIG. 6C.

When cartridge 10 has been inserted into tray 244, tray pins 264, 266 are near the top of tray pin slots 298, 300 (as shown in FIG. 26). Cam plate 252 is roughly at the position shown in FIG. 22. Cartridge load/unload motor and lead screw mechanism 229 moves towards the rear of disk drive 20. This motion rotates lever arm 284 clockwise and pulls cam plate 252 towards the front of disk drive 20. As a consequence of the mechanical interaction (described above) between cam slots 274, 276, tray pins 264, 266, and tray pin slots 298, 300, cartridge tray 244 starts to move downward.

As can be seen in FIG. 34A, when cartridge 10 has been fully inserted into cartridge tray 244, a front edge 304 of cartridge 10 is positioned directly over backstop 212 in housing 202. (Backstop 212 is shown in FIGS. 14 and 15.) FIGS. 34A and 34B show the position when the lowering of cartridge 10 has just begun. As indicated, front edge 304 has contacted the top surface of backstop 212, while cartridge 10 as a whole is still substantially horizontal. With the slight lowering of cartridge 10, door 206 has opened slightly further (as compared to its position in FIGS. 31A and 31B), and the continued contact between release cam 210 on door 206 and the surface of cartridge 10 has started to release cartridge 10 from cartridge catches 208A, 208B.

FIGS. 35A and 35B show the situation a instant later. Front edge 304 has come into contact with the top of backstop 212, and cartridge 10 is slightly tilted in a direction away from front edge 304. XY alignment pin 209 has started to enter the mouth of alignment feature 143. Alignment pin 209 is shown in FIGS. 14–16, and alignment feature 143 is shown in FIGS. 1 and 11.

Figure 36A:
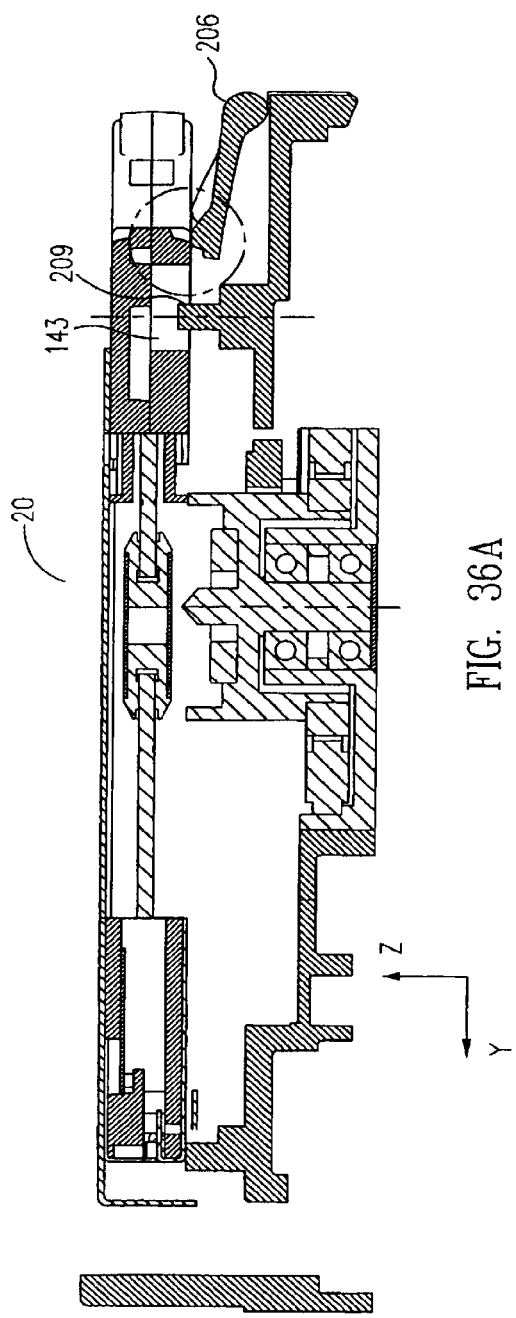
FIGS. 36A and 36B are cross-sectional views of the disk drive when the cartridge catches are about to release the cartridge.
Figure 36B:
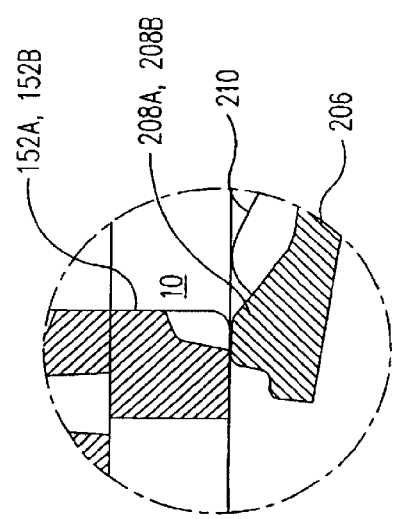

In FIGS. 36A and 36B, the tilting of cartridge 10 has continued, and as shown in FIG. 36A XY alignment pin 209 has further entered the oval portion 146 of alignment feature 143. Importantly, the continued lowering of the back edge of cartridge 10 against release cam 210 on door 206 has caused cartridge catches 208A and 208B almost to release cartridge 10.

The motion of cartridge 10 from the time cartridge 10 has been fully inserted into cartridge tray 244 until cartridge catches 208A and 208B release cartridge 10 is represented as motion #2 in FIG. 41.

Figure 37A:
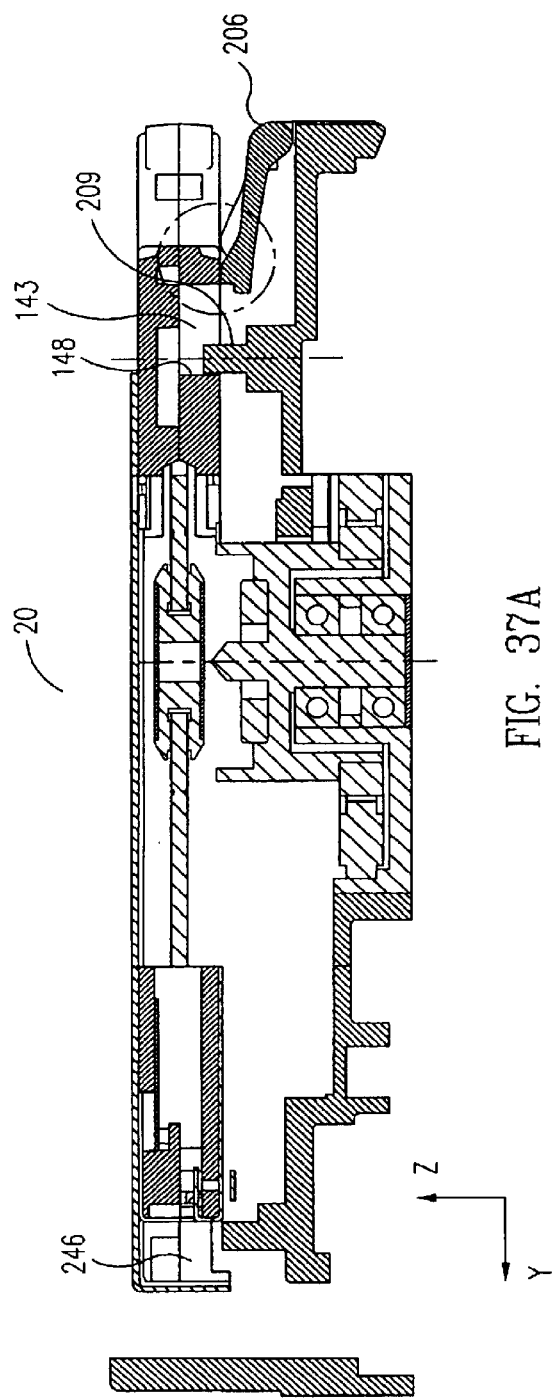
FIGS. 37A and 37B are cross-sectional views of the disk drive when the alignment feature engages the alignment pin.
Figure 37B:
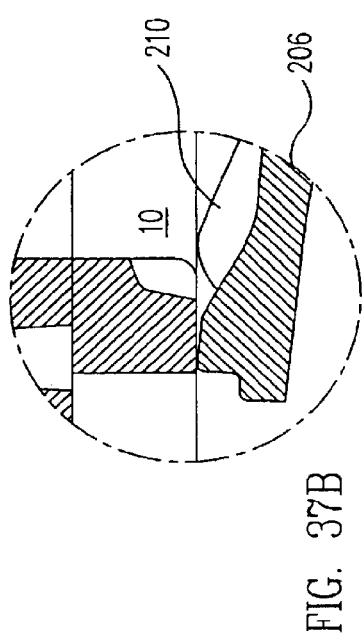

In FIGS. 37A and 37B, cartridge catches 208A and 208B have released cartridge 10. With cartridge 10 released, spring-loaded picker arm 246 tries to eject cartridge 10 from disk drive 20. Since XY alignment pin 209 has entered alignment feature 143, however, cartridge 10 is not ejected. Instead, the motion of cartridge 10 towards door 206 causes XY alignment pin 209 to become lodged against V-shaped portion 148 of alignment feature 143 (see FIG. 11), fixing the position of cartridge 10 in the X and Y dimensions. At the same time, the motion of cartridge 10 towards door 206 causes the front edge 304 to clear backstop 212. The end result is that cartridge 10 falls between V-shaped portion 148 of alignment feature 143 and the Y limiter 211.

The motion of cartridge 10 from the time cartridge catches 208A and 208B release cartridge 10 until XY alignment pin 209 becomes lodged against V-shaped portion 148 of alignment feature 143 is represented as motion #3 in FIG. 41.

After XY alignment pin 209 becomes lodged against V-shaped portion 148 of alignment feature 143, cartridge tray 244 begins to move downward. Cartridge tray 244 and cartridge 10 are guided into position by theta datum 214, theta limiter 216, Y limiter 211, and X limiters 294 and 296. Theta datum 214, theta limiter 216, Y limiter 211 contact cartridge 10 itself through openings in cartridge tray 244, and X limiters 294 and 296 contact the sides of cam plate 252.

This process continues until the lower surface of cartridge 10 comes into contact with Z datums 218, 220, 222, 224 and 226. As indicated above, datums 220 and 222 function as a single datum. Cartridge 10 flexes as necessary to insure contact with each of Z datums 218, 220/222, 224 and 226. In this position, optical disk 108 is properly seated on spindle motor 230 such that optical disk 108 may rotate freely without contacting the cartridge housings 102 and 104. This is the playing position for cartridge 10. This condition is shown in FIG. 38. At this point, in one embodiment the cartridge load/unload motor stalls and thereby maintains a force between cartridge tray 244, through cartridge 10 to housing 202 at Z datums 218, 220/222, 224 and 226. The nature of the system including the lead screw, lever arm 284 and cam slots 274, 276 is such that cam plate 252 cannot be back driven, and a clamping load is maintained through cartridge 10 against Z datums 218, 220/222, 224 and 226. In another embodiment, the operation of the cartridge load/unload motor is timed such that the motor turns off after cartridge 10 is clamped against the surfaces of Z datums 218, 220/222, 224 and 226. In either embodiment, spindle motor 230 then begins to rotate, allowing data to be read from or written to optical disk 108.

When cartridge 10 is seated on Z datums 218, 220/222, 224 and 226, the V-shaped portion 148 of alignment feature 143 is pressed against XY alignment pin 209 by the combined action of picker arm 246 and picker arm spring 250, thereby defining the position of cartridge 10 in the X and Y dimensions. An edge of cartridge 10 is pressed against theta datum 214 by the force of one of shutter return springs 140 and 142, thereby defining the position of cartridge 10 in the theta dimension.

The motion of cartridge 10 from the time XY alignment pin 209 becomes lodged against V-shaped portion 148 of alignment feature 143 until cartridge 10 is clamped against Z datums 218, 220/222, 224 and 226 is represented as motion #4 in FIG. 41.

When cartridge 10 is in the playing position, it is located as follows precisely in the correct location for reading and writing data to and reading data from optical disk 108. During the load process, cartridge 10 becomes located properly against datums in the X, Y, Z and theta dimensions. Cartridge 10 is located at alignment feature 143 in the X and Y dimensions by the biasing action of picker arm spring 250 to force V-shaped portion 148 of alignment feature 143 against XY alignment pin 209. Cartridge 10 is located in the theta dimension by the biasing action of shutter return spring 140 to force cartridge housing 102 against theta datum 214. Thus, cartridge 10 is located in the X, Y and theta dimensions by XY alignment pin 209 and theta datum 214, respectively. Cartridge 10 is located at the lower surface of housing 102 by the clamping action of cartridge tray 244, which is driven by cam plate 252, lever arm 284 and lead screw (not shown) against Z datums 218, 220/222, 224 and 226. Cartridge 10 is thus located in the X, Y, theta and Z dimensions, fully constraining its position. Cartridge 10 is prevented from moving during shock and vibration by a combination of forces. Shutter return spring 140 maintains a bias force against theta datum 214. Picker arm spring 250 maintains a bias force against XY alignment pin 209. In addition, the Z clamping force generated by the lead screw, lever arm 284 and cam plate 252 causes friction between cartridge 10 and the housing 202 which prevents movement except at high shock. Further limitation to misalignment in the X, Y and theta dimensions is provided by limiters. Theta limiter surface 216 limits theta rotation of the cartridge 10 in the clockwise direction. Y limiter 211 limits y movement of the cartridge in the positive y direction. The position of limit surfaces 216 and 211 act to prevent cartridge motion of sufficient magnitude to cause optical disk 108 to contact cartridge housings 102 and 104 during operation.

The datums are shown in one or more of FIGS. 14–16 and 22. Openings are provided at appropriate locations on cartridge tray 244 and cam plate 252 to ensure that theta datum 214, theta limiter 216 and Y limiter 211 are able to contact the corresponding surfaces of cartridge 10. For example theta datum 214 and theta limiter 216 contact cartridge 10 through openings 260 and 262, shown in FIGS. 20 and 32. As can be seen in FIGS. 29, 30 and 32, the surfaces of cartridge 10 which contact Z datums 218, 220/222, 224 and 226 are exposed through open areas of cartridge tray 244. X limiters 294 and 296 do not contact the cartridge itself but instead contact the surface of cam plate 252.

In some embodiments there may be only three Z datums, in which case the cartridge need not be flexible to be fully seated on the Z datums. In other embodiments there may be five or more Z datums.

Thus the position of cartridge 10 is defined kinematically by six points: two points of contact between XY alignment pin 209 and the V-shaped portion 148 of alignment feature 143; one point of contain between cartridge 10 and theta datum 214, and three points of contact between cartridge 10 and the Z datums.

After data has been read from or written to optical disk 108, a signal is transmitted to the cartridge load/unload motor-lead screw arrangement causing the motor to begin rotating in the reverse direction. This causes lever arm 284 to rotate in a counterclockwise direction, moving cam plate 252 towards the rear of disk drive 20. As is apparent from FIG. 22, for example, as cam plate 252 moves towards the rear of disk drive 20, cam slots 274, 276 force tray pins 264, 266 (and cartridge tray 244) upward in tray pin slots 298, 300. This motion continues until alignment feature 143 clears XY alignment pin 209.

The motion of cartridge 10 from the time cartridge 10 begins to rise from Z datums 218, 220/222, 224 and 226 until alignment feature 143 clears XY alignment pin 209 is represented as motion #5 in FIG. 41.

The condition when alignment feature 143 has cleared XY alignment pin 209 is shown in FIG. 39. As indicated, cartridge catches 208A and 208B are pressed against the flat bottom surface of cartridge 10 and do not operate to restrain cartridge 10. Therefore, with nothing restraining cartridge 10 in disk drive 20, the force of spring-loaded picker arm 246 takes over, beginning to eject cartridge 10 from drive 20.

Figure 40:
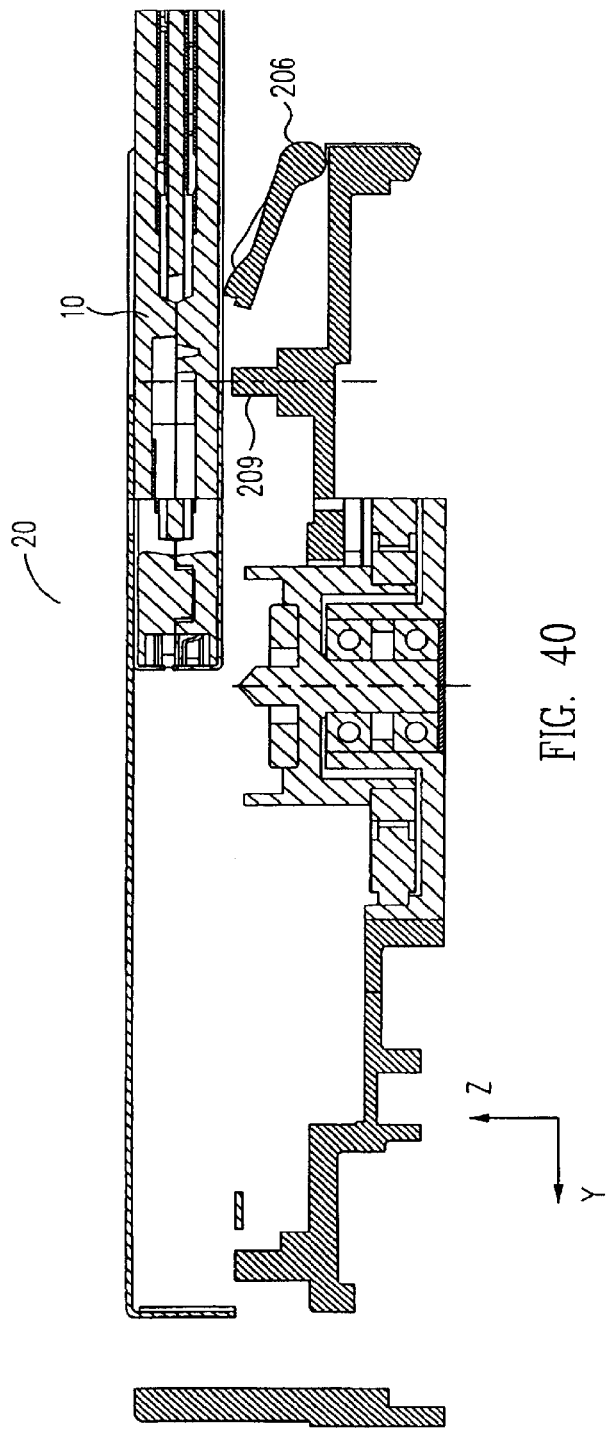
FIG. 40 is a cross-sectional view of the disk drive when the cartridge has been partially ejected and the eject limiters in the disk drive have engaged the eject limit slot catches on the cartridge.

As picker arm 246 continues to push cartridge 10 out of drive 20, protrusions 268A, 270A of eject limiters 268, 270 (shown in FIG. 20) slide along eject limit slots 154A, 154B, respectively, (shown in FIG. 1) until protrusions 268A, 270A come into contact with eject limit slot catches 156A, 156B at the respective ends of eject limit slots 154A, 154B. At this point picker arm 246 does not provide enough force to overcome the resistance of eject limit slot catches 156A, 156B and the ejection of cartridge 10 from disk drive 20 is suspended. Thus eject limiters 268, 270 operate to prevent cartridge 10 from being ejected from drive 20 onto, for example, the floor, where cartridge 10 could be damaged. The position of cartridge 10 at this point is shown in FIGS. 10 and 40.

The motion of cartridge 10 from the time alignment feature 143 has cleared XY alignment pin 209 until protrusions 268A, 270A come into contact with eject limit slot catches 156A, 156B is represented as motion #6 in FIG. 41.

At this point the back of cartridge 10 protrudes from disk drive 20, and the user is free to remove cartridge 10 entirely from disk drive 20. The force applied by the user easily overcomes the spring force of eject limiters 268, 270 and causes eject limiters 268, 270 to ride over eject limit slot catches 156A, 156B. This motion of cartridge 10 is represented as motion #7 in FIG. 41.

As is evident from FIGS. 14, 16 and 20–23, the loading/unloading of cartridge 10 is largely governed by the action of the pair of tray pins 264, 266 in tray pin slots 298, 300 and cam slots 274, 276. The use of two tray pins has several advantages over the use of three or more tray pins. First, with two tray pins cartridge tray 244 is free to rotate to some extent about the X axis (see, for example, FIG. 29). This allows the tilting of cartridge tray 244, as shown in FIGS. 35A and 36A, and thereby assist in the positioning of cartridge 10 against XY alignment pin 209. This type of action is difficult if not impossible to achieve if more than two tray pins are used. In addition, the positioning of the two tray pins 264, 266 in the Y-direction on cartridge tray 244 can be adjusted to obtain a desired distribution of the clamping force against Z datums 218, 220/222, 224 and 226, respectively, when the cartridge is fully loaded. For example, moving the tray pins 264, 266 in the direction away from the front edge 304 of cartridge 10 (and towards door 206) causes a greater portion of the clamping force to be applied against Z datums 218 and 226 (see FIG. 15).

Moreover, using two tray pins establishes a unique, definitive clamping line that determines the forces against the Z datums. If three or more tray pins are provided, depending on manufacturing tolerances the lines between different pairs of the tray pins could form the operative clamping line for a given cartridge and thus the clamping force against the Z datums is less predictable than if two tray pins are used.

Figure 42:
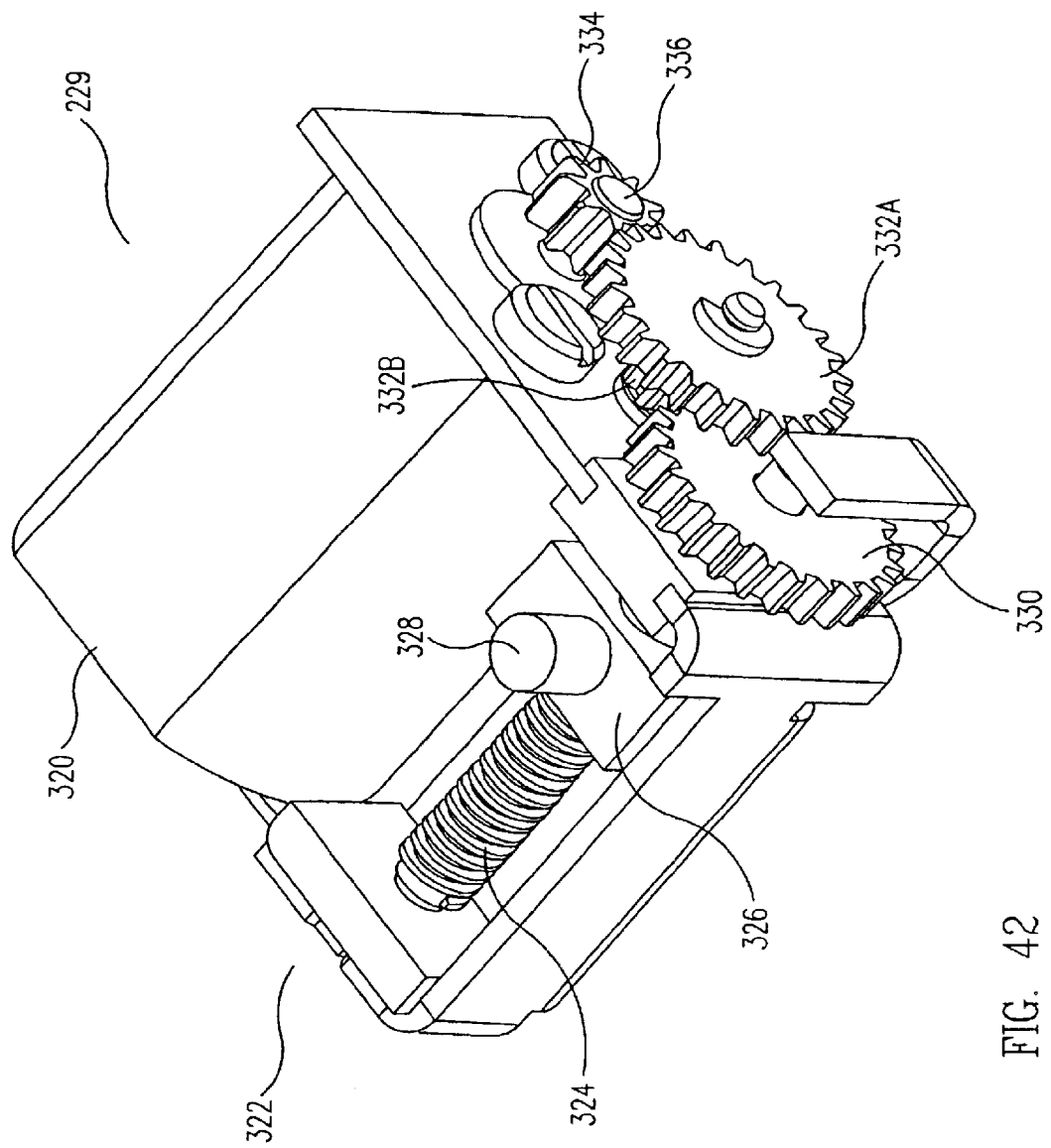
FIG. 42 is a perspective view of the cartridge load/unload motor lead screw mechanism.

FIG. 42 shows cartridge load/unload motor and lead screw mechanism 229, which includes a cartridge load/unload motor 320 and a lead screw mechanism 322. Lead screw mechanism 322 includes a lead screw 324 and a nut 326. A pin 328, attached to nut 326, fits through slot 295 of lever arm 284. Cartridge load/unload motor 320 is a DC motor which can be run in either of two directions, depending on the polarity of the current supplied to the motor leads. An output shaft 336 of motor 320 drives a gear train comprising an input gear 334, second stage gears 332A and 332B (which share a common shaft), and an output gear 330. Input gear 334 meshes with gear 332A, and gear 332B meshes with output gear 330. Output gear 330 is mounted on a shaft which drives a lead screw 324. Thus pin 328 is the output point of cartridge load/unload motor and lead screw mechanism 229 and drives lever arm 284, which drives cam plate 252. Cam plate 252 in turn drives tray pins 264, 266 via cam slots 274, 276. Tray pins 264, 266 are attached to cartridge tray 244. The force on tray pins 264, 266 is transferred to cartridge 10 via cartridge tray 244 and represents the clamping force that holds cartridge 10 against the Z datums in the playing position. The net effect of this entire mechanism is to convert a torque at input gear 334 of cartridge load/unload motor and lead screw mechanism 229 into a linear clamping force applied to cartridge 10. The nature of the mechanism is to amplify the force through the various stages of the linkage.

Chapter 5 of M. F. Spotts, *Design of Machine Elements*, 4$^{th}$ ed., Prentice-Hall (1971), incorporated herein by reference, describes the usage and design of power screws. Lead screw mechanism 322 is a specific embodiment of one such power screw. The equation relating the force provided by the nut to the torque applied to the lead screw is as follows:

$$T = r_t W \left( \frac{\cos\theta_n \tan\alpha - \mu_1}{\cos\theta_n + \mu_1 \tan\alpha} + \frac{r_c}{r_t} \mu_2 \right)$$

where T is torque applied to the lead screw (mm), $r_t$ is the pitch radius of the lead screw (mm), W is the force provided by the nut (N), $\theta_n$ is one-half the included thread angle of the lead screw (deg), $\alpha$ is thread helix angle (deg), $\mu_1$ is the coefficient of friction between the lead screw and the nut, $r_c$ is the radius of the lead screw's thrust bearing (mm), and $\mu_2$ is the coefficient of friction between the lead screw and the thrust bearing.

One of the specific design objectives and advantages of the mechanical linkage between gear 334 and cartridge tray 244 is that it cannot be "driven backwards". In other words, a force on the cartridge, created for example by a shock event, is not be able to cause cartridge tray 244 or gear 334 to move. The mechanism cannot be driven backwards from its output end (the cartridge).

The gain of the mechanism when driven in reverse is essentially the inverse of the gain of the mechanism when driven in the forward direction. Thus the gain is actually a force reducer when driven in reverse. In addition, the embodiment of the lead screw or power screw element of the load/eject module is specifically designed to prevent back driving. Spotts, supra, refers to this as "overhauling", where the force input at the nut will drive the lead screw. With careful selection of the design parameters listed above, back driving of the lead screw is impossible. As indicated in Spotts, the equation relating force and torque for the "overhauling" screw is:

$$T = r_t W \left( \frac{\cos\theta_n \sin\alpha - \mu_1}{\cos\theta_n - \mu_1 \tan\alpha} + \frac{r_c}{r_t}\mu_2 \right)$$

When the term in parenthesis goes to zero, the transition between a geometry that can be back driven and one that cannot be back driven is reached.

The thread helix angle ($\alpha$) is the variable of interest. The following values are assumed for the other parameters: $r_t$=0.75 mm, $\theta_n$=approximately zero, $\mu_1$=0.2, $r_c$=0.2 mm, $\mu_2$=0.2

Solving for the helix angle $\alpha$ yields a value of approximately 14 degrees. In other words, a helix angle of less than 14 degrees will result in a lead screw that will not turn when force is applied to the nut. A helix angle greater than 14 degrees would allow the nut to force the lead screw to turn.

As the helix angle is increased, the force required to turn the screw becomes less (i.e., back-driving becomes easier). The helix angle for this embodiment has been selected to be approximately 4 degrees, safely on the side of the critical angle to prevent back-driving. Once the condition of no back-driving is satisfied, the helix angle is optimized to increase force output at the nut for a given torque input on the lead screw, as well as to define the speed that the nut moves as a function of the lead screw speed.

Figure 43A:
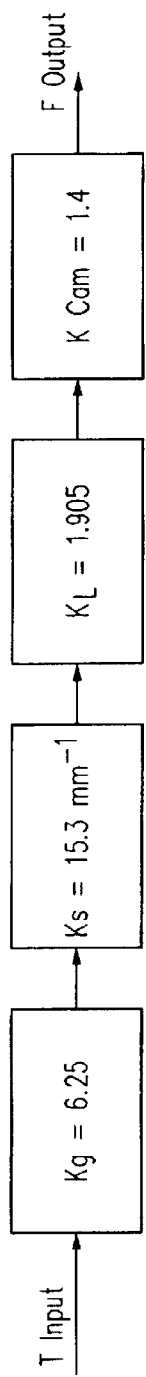
FIGS. 43A–43B are block diagrams illustrating the transfer function from the output of the cartridge load/unload motor to the cartridge tray.
Figure 43B:
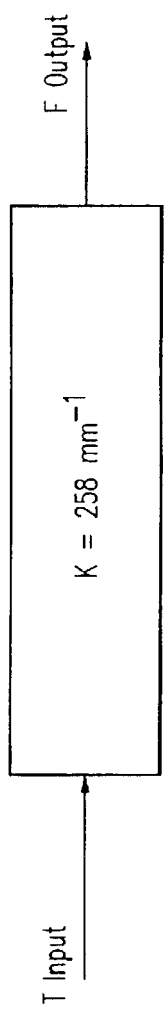
Figure 43C:
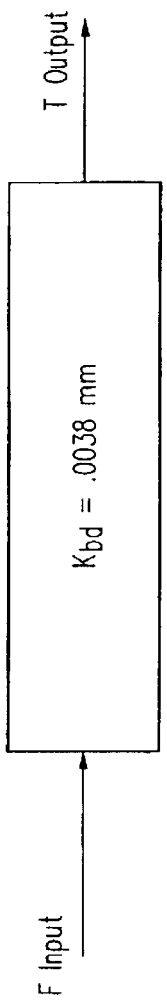
FIG. 43C is a block diagram illustrating the transfer function from the cartridge tray to the output of the cartridge load/unload motor when the mechanism is back driven.

The mechanical linkage between gear 334 and cartridge tray 244 can be represented by a block diagram transfer function as shown in FIGS. 43A–43C. Each block in 43A represents a mechanical element of the linkage between gear 334 and cartridge tray 244. The gear train coefficient (Kg) has a value of approximately 6.25 and is a unit-less factor, since the input and output of this stage are both torques. The lead screw coefficient (Ks) has a value of 15.28 and units of mm−1, since the input is a torque and the output is a force. The lever arm coefficient ($K_L$) is 1.905 and is unit-less, since the input and output are both forces. The cam plate coefficient (K Cam) has a value of 1.42 resulting from the 35 degree cam slot angle and is unit-less, since the input and output are both forces. The block diagram of FIG. 43A can be represented by an equivalent block diagram as in FIG. 43B, where the coefficients Kg, Ks, $K_L$ and K Cam have been combined by multiplication and the resulting coefficient K is about 258 mm$^{-1}$. FIG. 43C represents the mechanism of FIG. 43B when the mechanism is inverted or "driven backwards". The resulting gain of the system when driven backwards ($K_{bd}$) is 0.0038 (mm), significantly less than one, meaning the force is reduced through the mechanism. Even in a system where the helix angle is greater than the critical "overhauling" angle, the reduction of force through the mechanism acts to prevent back driving.

An advantage of this load mechanism over prior art is that this mechanism does not utilize a spring to hold the cartridge against the location datums. Rather, it uses a system comprising cams, levers, lead screws and gears to provide both translation of the cartridge (loading) and constraint of the cartridge (not back driveable).

While particular embodiments of the present invention have been shown and described, it will be recognized by those skilled in the art that, based upon the teachings herein, further changes and modifications may be made without departing from this invention and its broader aspects, and thus, the appended claims are to encompass within their scope all such changes and modifications as are within the true spirit and scope of this invention.

We claim:

1. A disk drive for reading data from and/or writing data to a data storage disk housed in a cartridge, said disk drive comprising:
   a housing having a tray pin slot;
   a tray for holding a cartridge, the tray including a tray pin operably disposed in the tray pin slot and movable in the tray pin slot so as to move said cartidge between a loaded position where data can be read from and/or written to the data storage disk and an unloaded position where data cannot be read from and/or written to the data storage disk;
   an actuator including a pickup unit for reading data from and/or writing data to the data storage disk; and
   a door being pivotable about an axis and including a first cartridge catch and a second cartridge catch each configured to engage a corresponding first shoulder and second shoulder disposed on a cartridge to resist a force tending to remove said cartridge from the disk drive,
   the door including a release cam operative to release the cartridge from the first cartridge catch and the second cartridge catch.

2. The disk drive of claim 1 further comprising a flag movable between a first position and a second position, wherein the flag breaks a sensor beam when the flag is in the first position, the breaking of the sensor beam causing a load motor to turn on.

3. The disk dive of claim 2 further comprising a sensor, wherein movement of the flag is detected by the sensor wherein detection by a sensor of movement of a flag closes a switch which completes an electrical circuit and causes the load motor to turn on.

4. The disk drive of claim 1 comprising at least two tray pins and at least two pin slots.

5. The disk drive of claim 1 wherein the tray pin slot is substantially vertical.

6. The disk drive of claim 1 further comprising a cam plate, the cam plate having a cam slot disposed at an oblique angle to the tray pin slot, the tray pin extending through the cam plate slot.

7. The disk drive of claim 6 further comprising a drive mechanism for moving the cam plate, the action of the cam slot as the cam plate moves driving the tray pin so as to move said cartridge between the loaded position and the unloaded position.

8. The disk drive of claim 7 comprising x, y, z and theta datums for defining the position of said cartridge in said disk drive when said cartidge is in the loaded position.

9. The disk drive of claim 7 wherein the drive mechanism comprises a lever arm, the lever arm comprising a first end, a second end and a pivot; the first end of the lever arm configured to receive a first force from the drive mechanism, the lever arm configured to rotate around the pivot, the second end of the lever arm coupled to the cam plate.

10. A disk drive, comprising:
    a housing having a tray pin slot;
    a cam plate having a cam slot;
    a tray configured to hold a data cartridge, the tray including a tray pin, the tray pin operably disposed in the tray pin slot and a cam slot; and
    a door being pivotable about an axis and including at least one cartridge catch configured to engage at least one shoulder of the cartridge to resist a force tending to remove the cartridge and retain the cartridge in the disk drive,
    the door including a release cam operative to release the cartridge from the at least one cartridge catch.

11. The disk drive of claim 10 wherein the tray pin slot is substantially vertical.

12. The disk drive of claim 10 wherein the cam slot is disposed at an oblique angle to the tray pin slot, the tray pin extending through the cam plate slot.

13. The disk drive of claim 12 wherein the cam slot is disposed at an angle of about 51.5 degrees to the tray pin slot.

14. The disk drive of claim 10 further comprising a drive mechanism for moving the cam plate, action of the cam slot as the cam plate moves driving the tray pin between a loaded position and an unloaded position.

15. The disk drive of claim 14 wherein the drive mechanism comprises a lever arm, the lever arm comprising a first end, a second end and a pivot; the first end of the lever arm configured to receive a first force from the drive mechanism, the lever arm configured to rotate around the pivot, the second end of the lever arm coupled to the cam plate.

16. The disk drive of claim 14 wherein the drive mechanism comprises a lead screw mechanism, the lead screw mechanism comprising a lead screw having a helix angle less than 14 degrees.

17. The disk of claim 16 wherein the helix angle is approximately 4 degrees.

18. The disk drive of claim 10 further comprising a flag movable between a first position and a second position, wherein the flag breaks a sensor beam when the flag is in the first position, the breaking of the sensor beam causing a load motor to turn on.

19. The disk drive of claim 18 further comprising a sensor wherein movement of the flag is detected by the sensor, wherein detection by the sensor of movement of a flag closes a switch which completes an electrical circuit and causes the load motor to turn on.

* * * * *